United States Patent
Kimura

(10) Patent No.: US 9,081,170 B2
(45) Date of Patent: Jul. 14, 2015

(54) ZOOM LENS AND IMAGE PICKUP APPARATUS INCLUDING THE SAME

(75) Inventor: Tomonori Kimura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 13/283,823

(22) Filed: Oct. 28, 2011

(65) Prior Publication Data

US 2012/0113516 A1 May 10, 2012

(30) Foreign Application Priority Data

Nov. 4, 2010 (JP) ................. 2010-247270

(51) Int. Cl.
*G02B 15/14* (2006.01)
*G02B 15/173* (2006.01)
*G02B 27/64* (2006.01)

(52) U.S. Cl.
CPC ............ *G02B 15/173* (2013.01); *G02B 27/646* (2013.01)

(58) Field of Classification Search
CPC ............... G02B 13/02–13/04; G02B 15/14; G02B 15/16; G02B 15/163–15/20; G02B 27/646; G03B 2205/0046; G03B 2205/0007–2205/0023
USPC ................. 359/676, 680–685, 557
See application file for complete search history.

(56) References Cited

U.S. PATENT DOCUMENTS

| 6,124,972 | A | 9/2000 | Hayakawa et al. |
| 7,177,092 | B2 | 2/2007 | Satori et al. |
| 7,336,426 | B2 | 2/2008 | Nakatani et al. |
| 7,609,446 | B2 | 10/2009 | Nanba |
| 2011/0109980 | A1* | 5/2011 | Hirokane et al. ............ 359/796 |

FOREIGN PATENT DOCUMENTS

| JP | 2010-197766 A | 9/2010 |
| JP | 2010-197767 A | 9/2010 |

* cited by examiner

*Primary Examiner* — Stephone B Allen
*Assistant Examiner* — James McGee
(74) *Attorney, Agent, or Firm* — Canon USA Inc. IP Division

(57) ABSTRACT

A zoom lens includes first to fifth lens units having positive, negative, positive, negative, and positive refractive powers. During zooming, the fourth lens unit having a positive lens and a negative lens does not move, and the second, third, and fifth lens units move. The fourth lens unit moves to have a component perpendicular to the optical axis. The focal length of the entire system at the telephoto end, the focal length of the fourth lens unit, the focal length and the material of the positive lens of the fourth lens unit, the maximum moving distance, at the telephoto end, of the fourth lens unit, the lateral magnification of the fourth lens unit at the telephoto end, and the lateral magnification, at the telephoto end, of a lens system disposed at the image plane side with respect to the fourth lens unit are appropriately set.

15 Claims, 26 Drawing Sheets

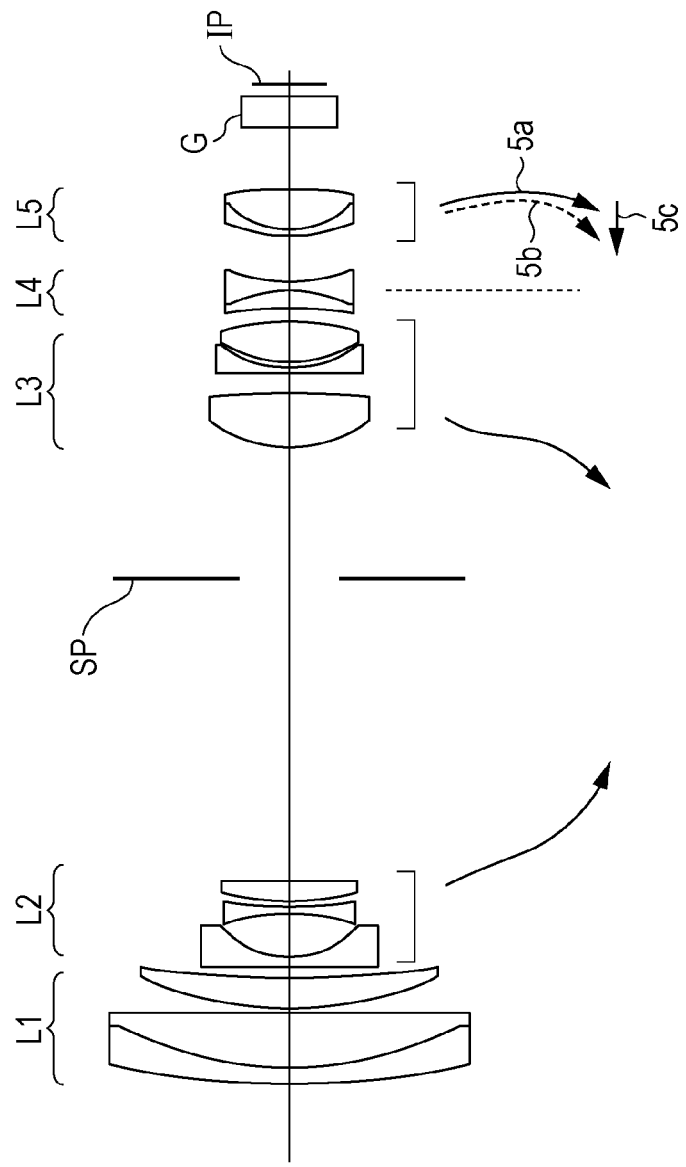

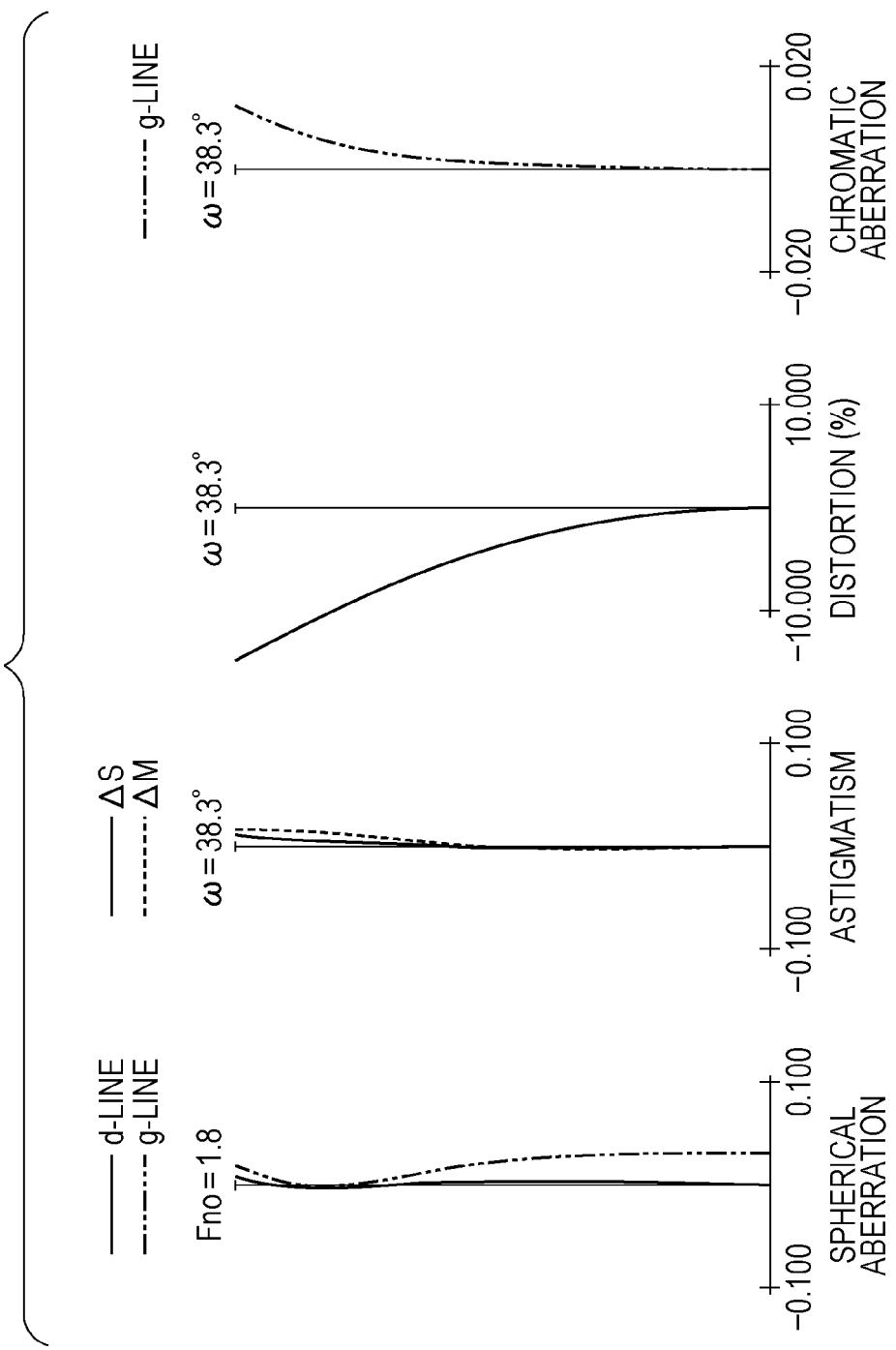

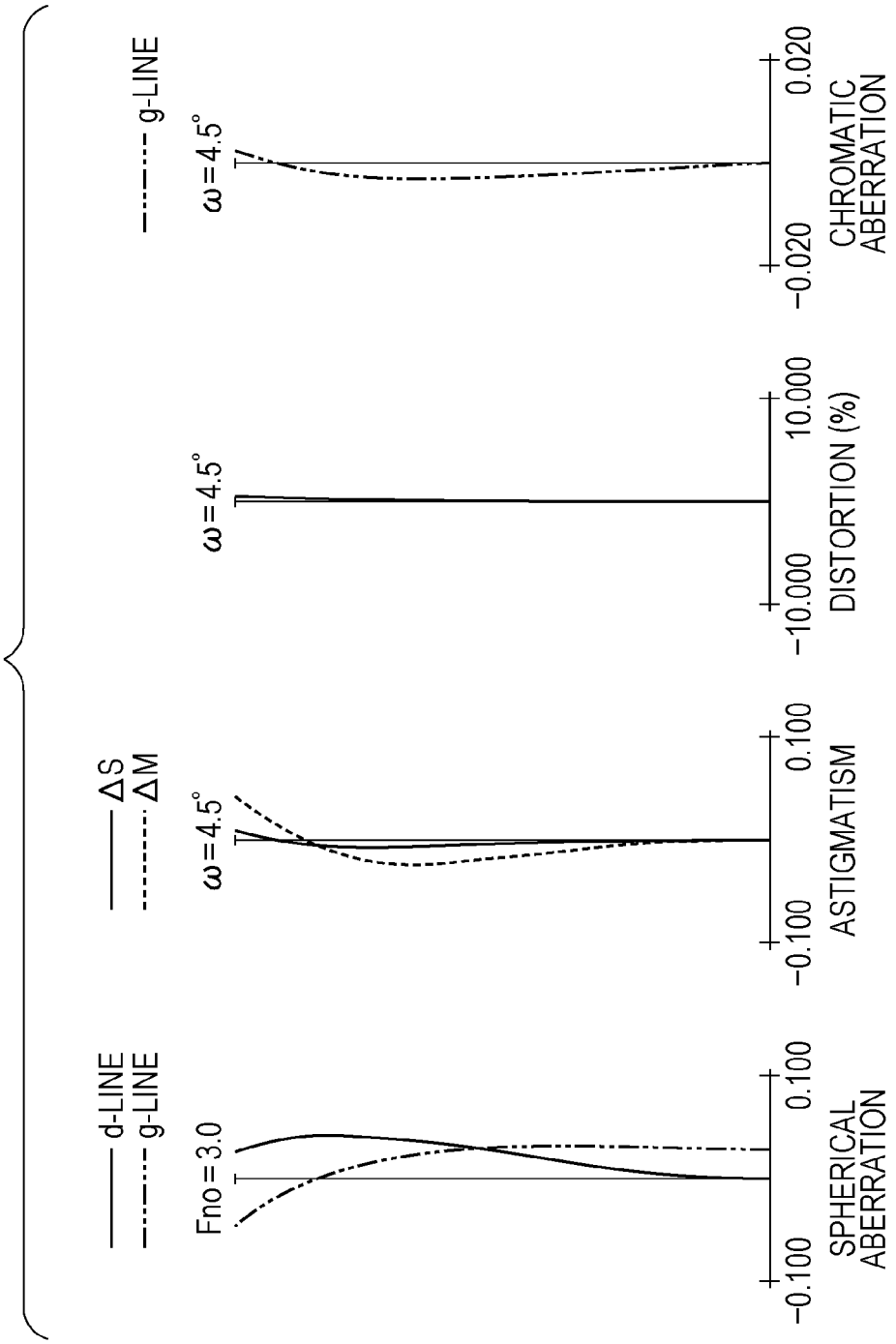

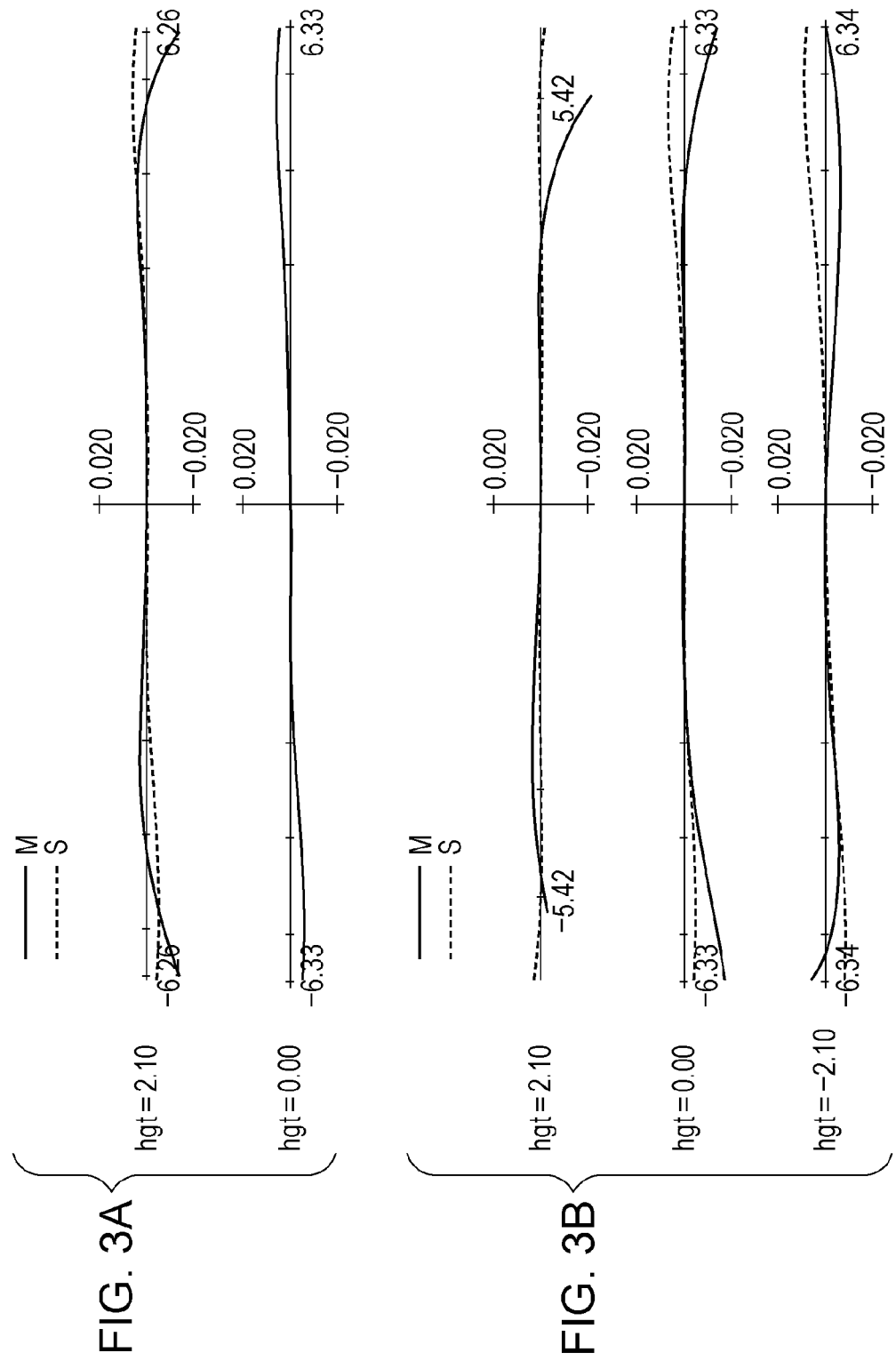

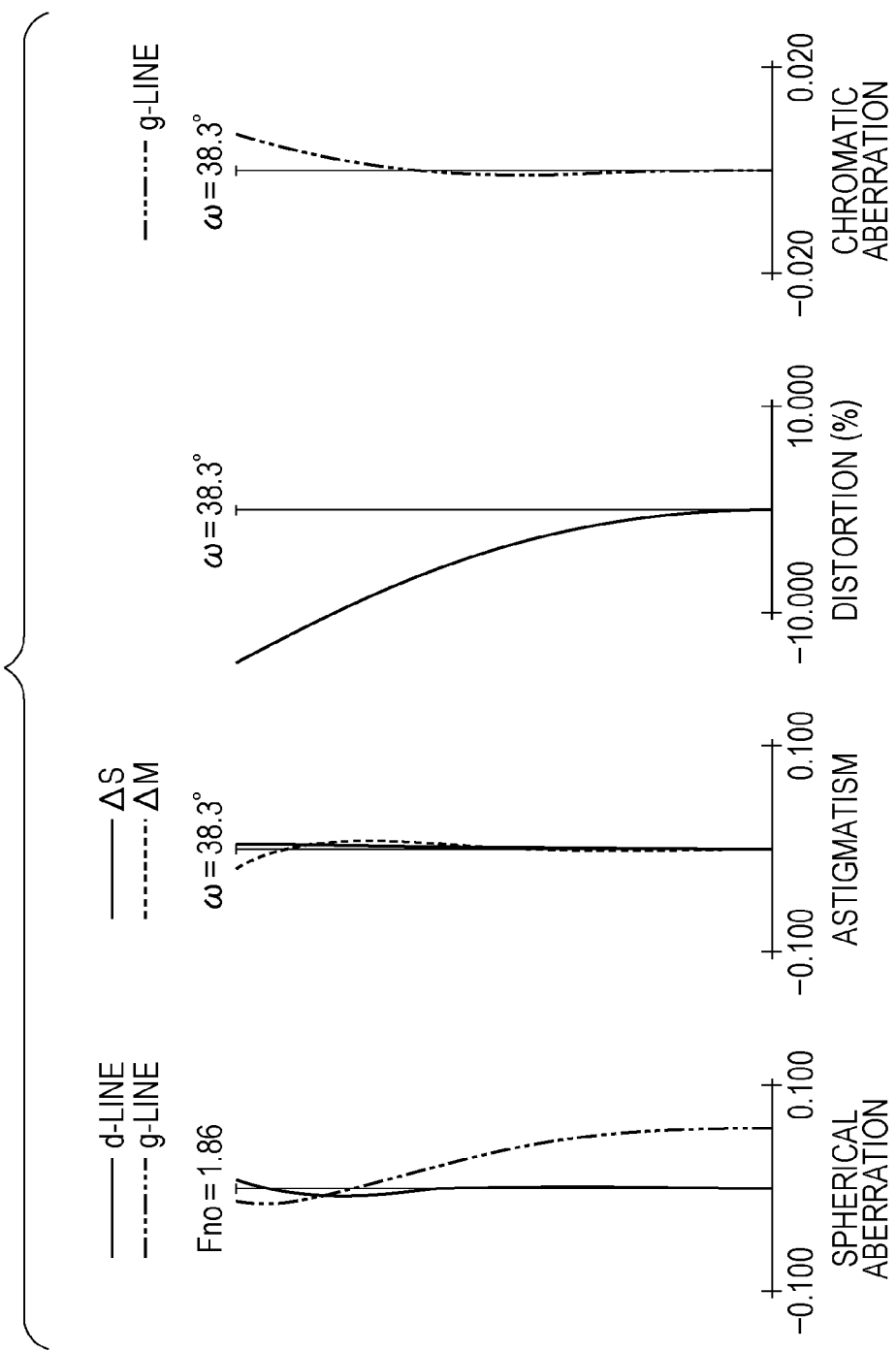

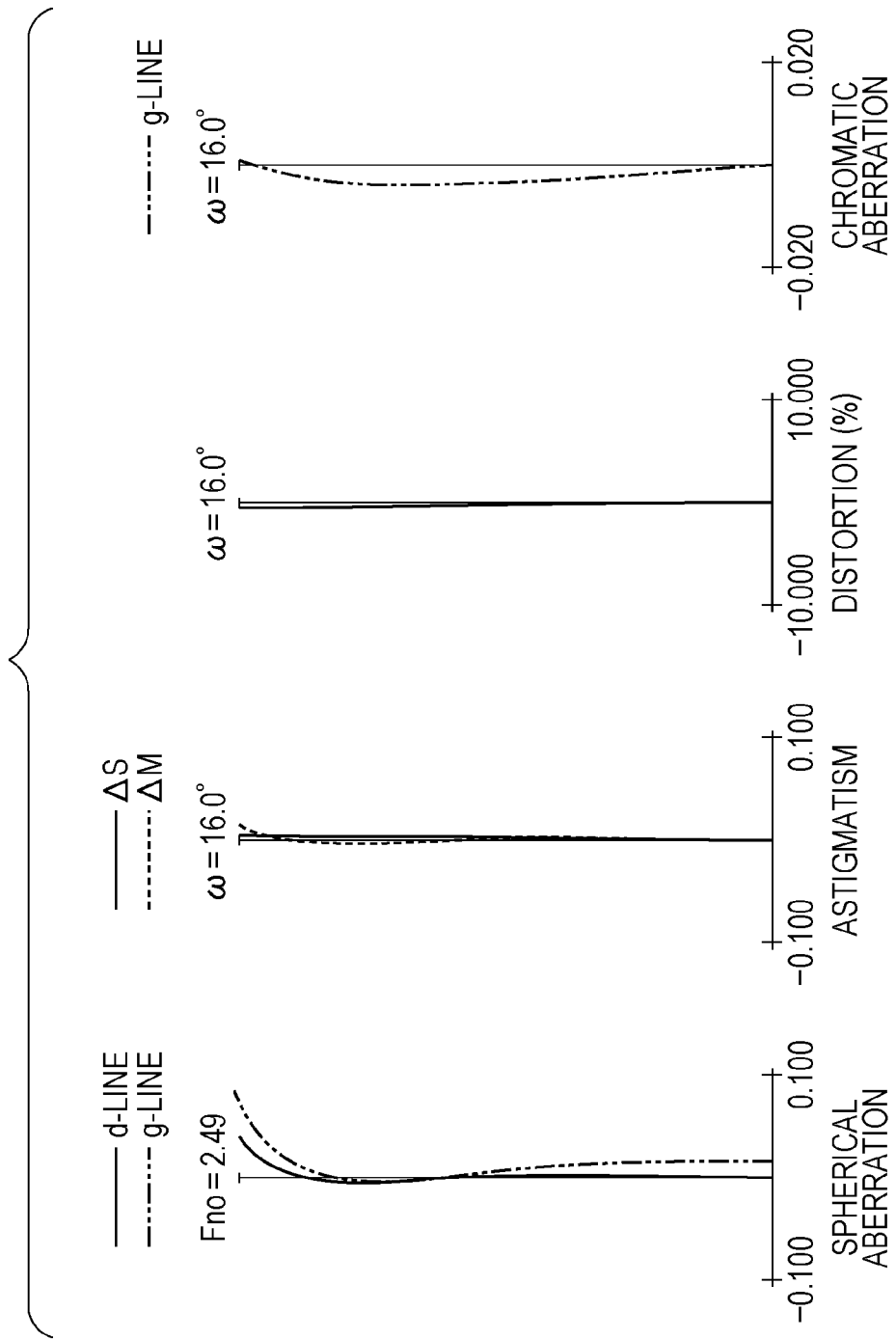

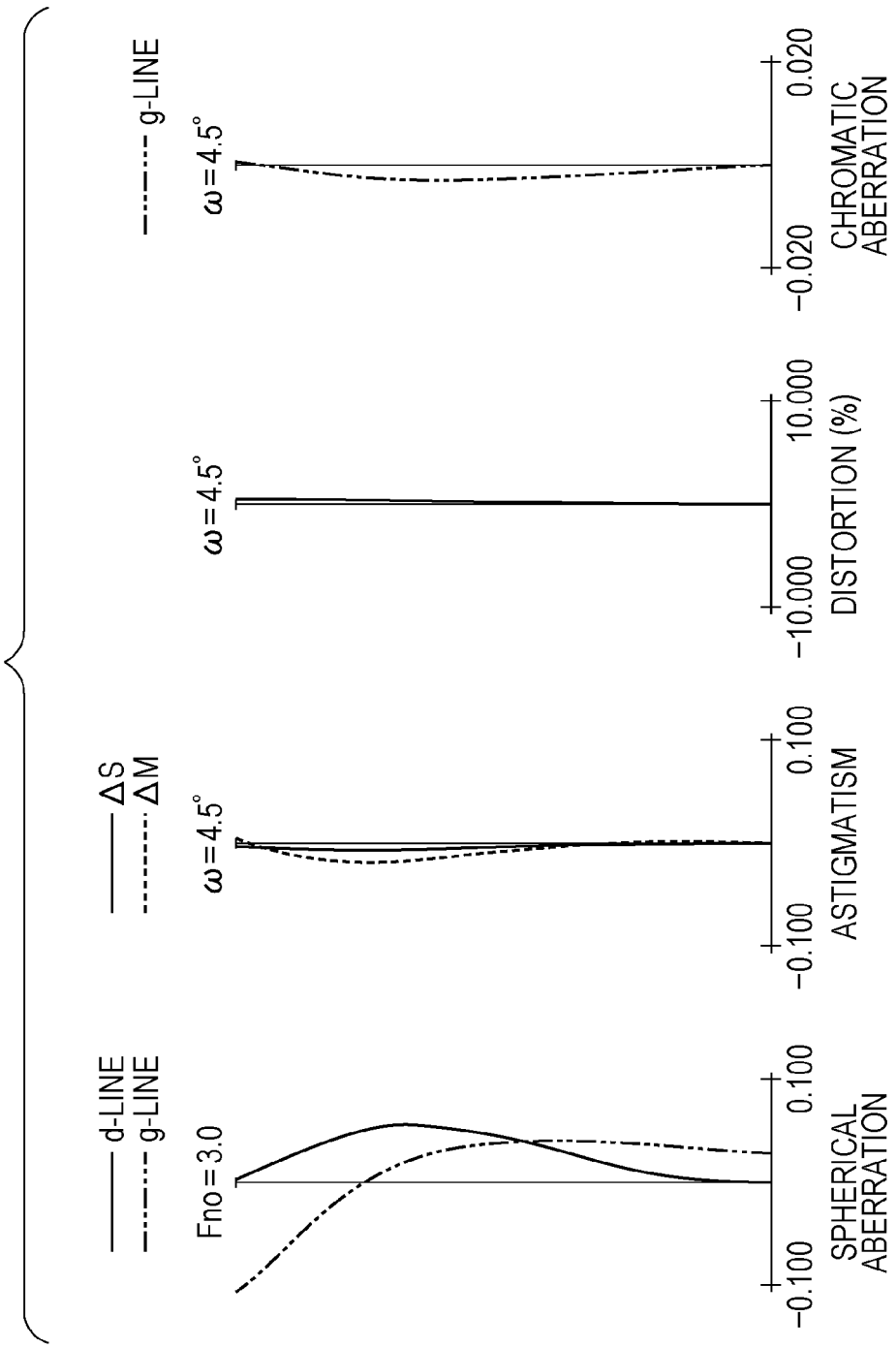

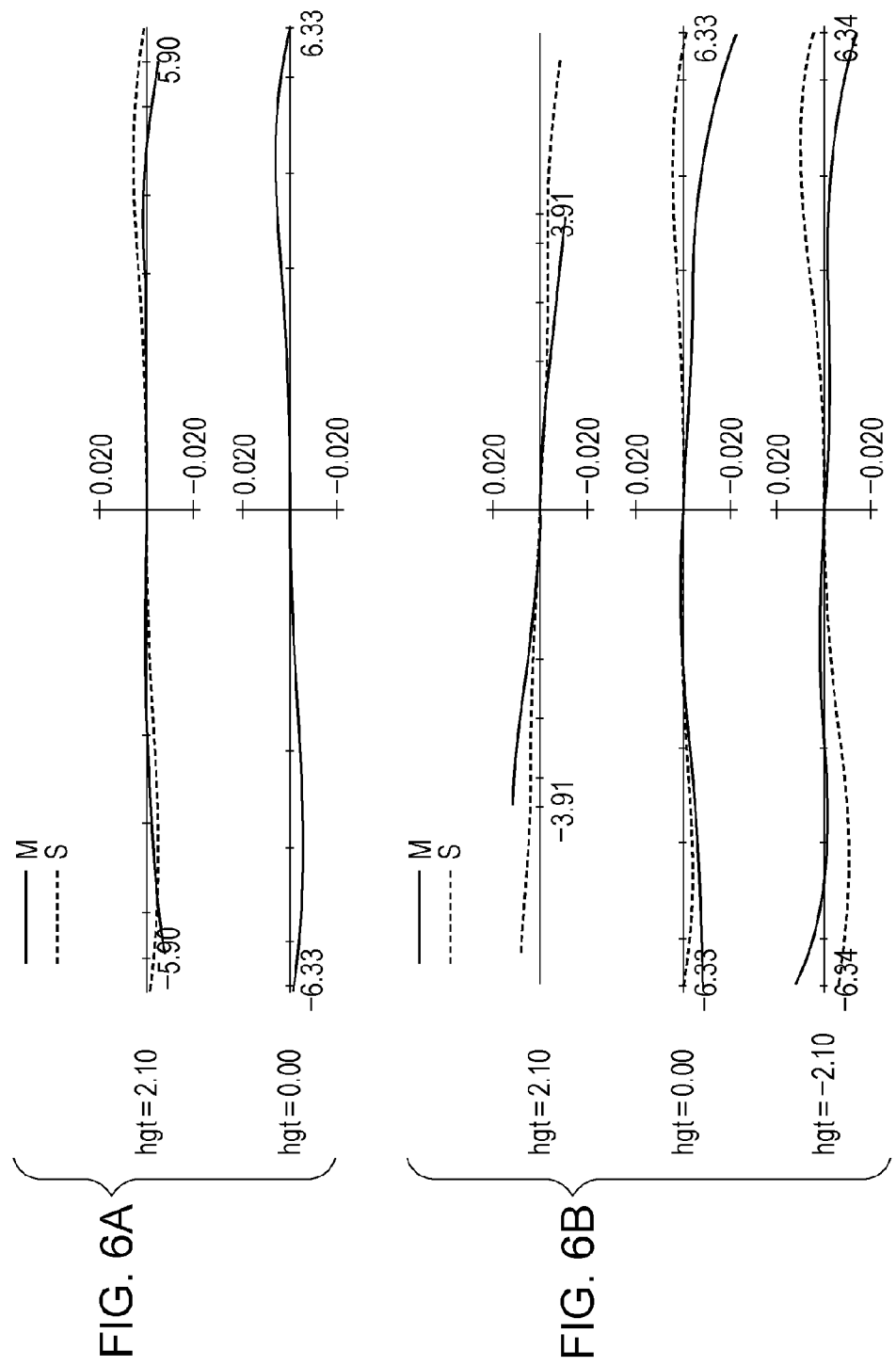

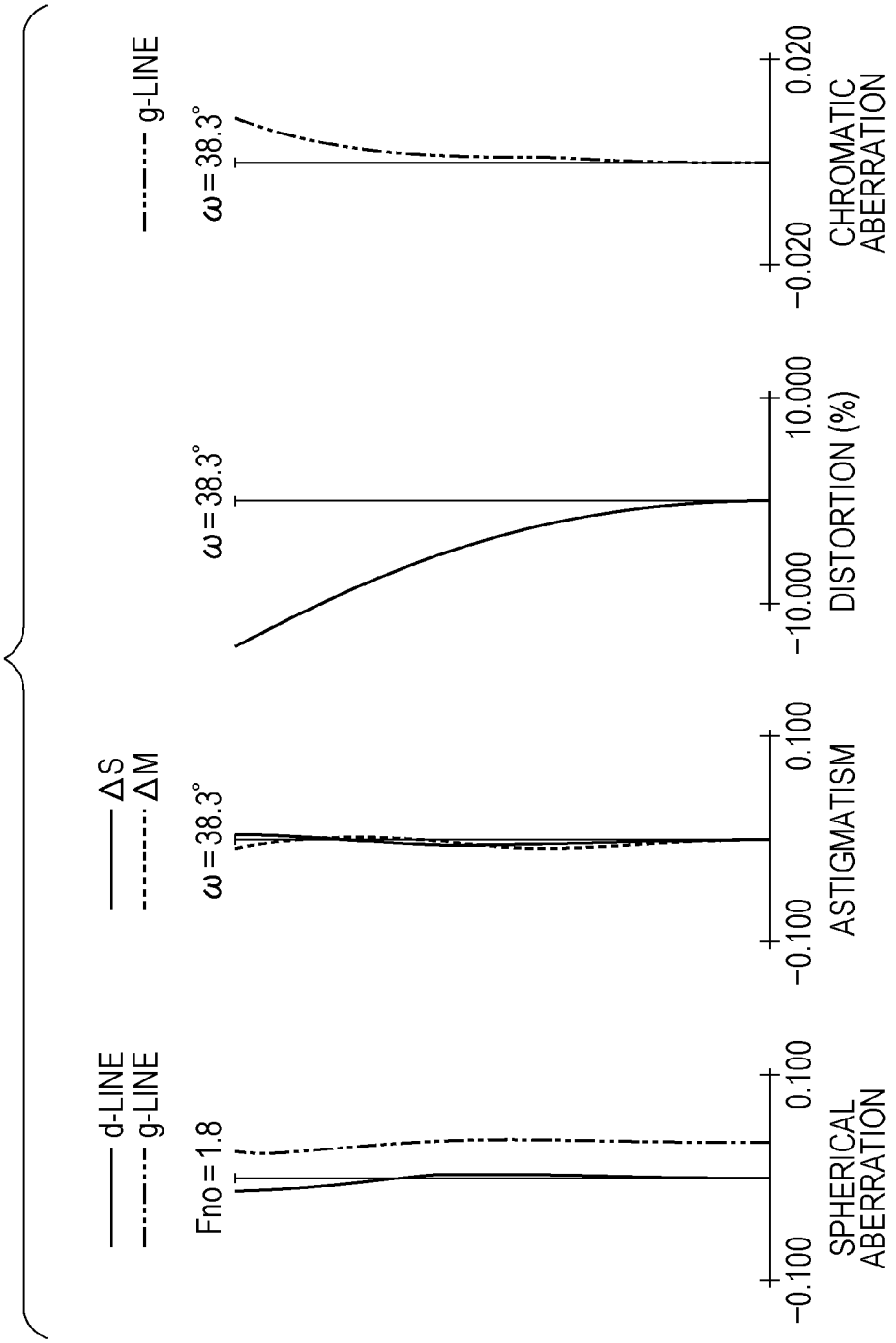

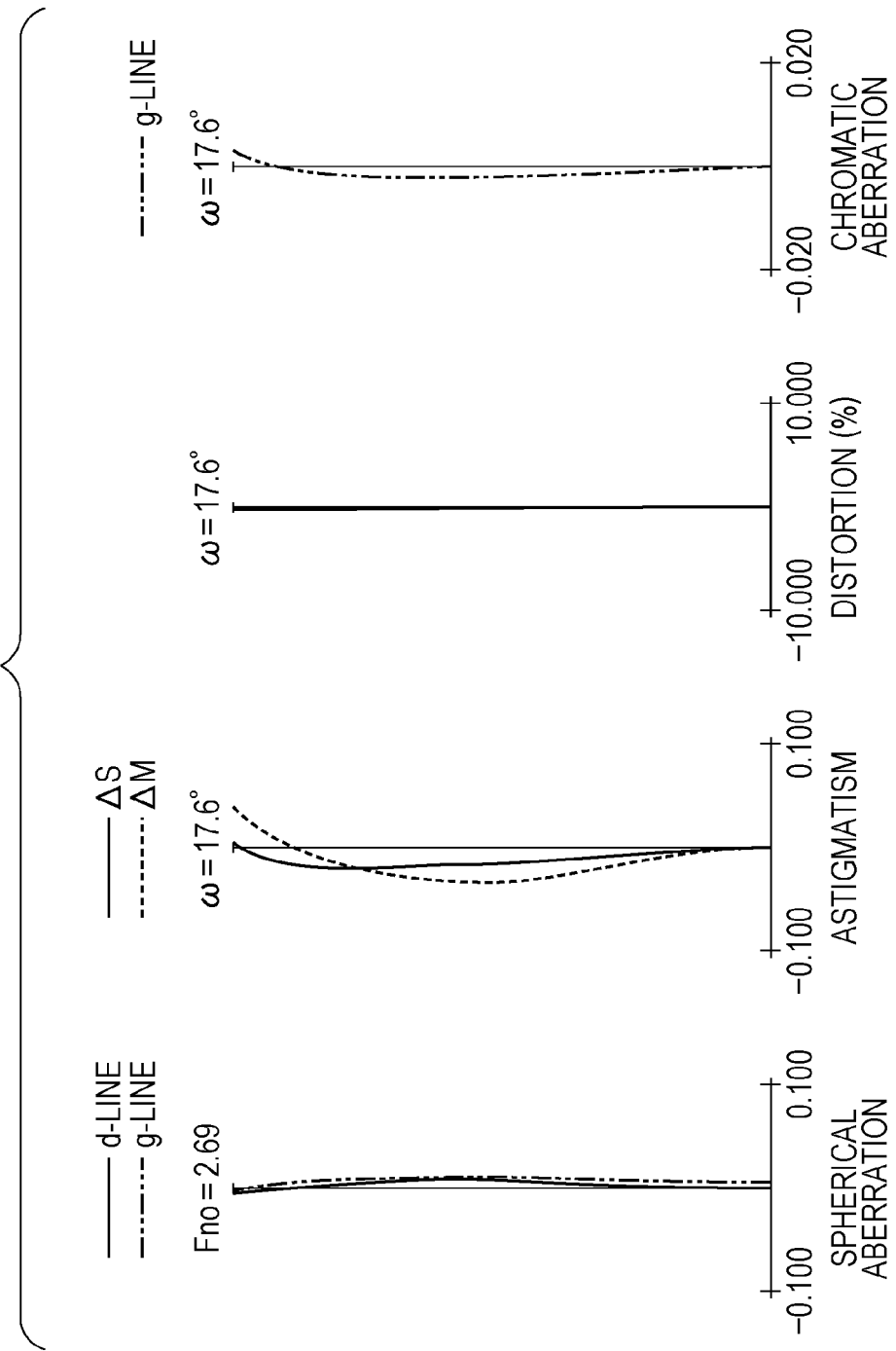

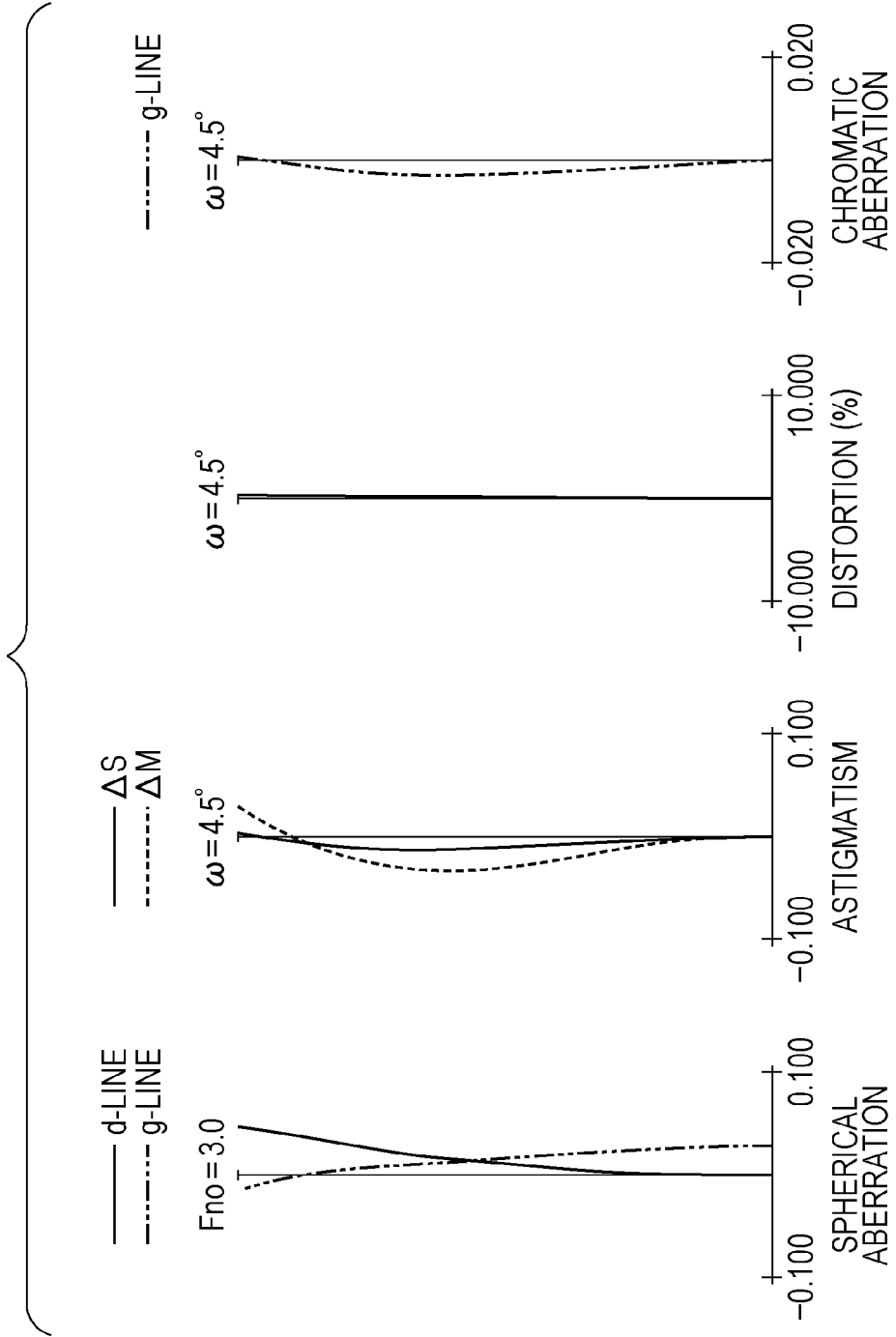

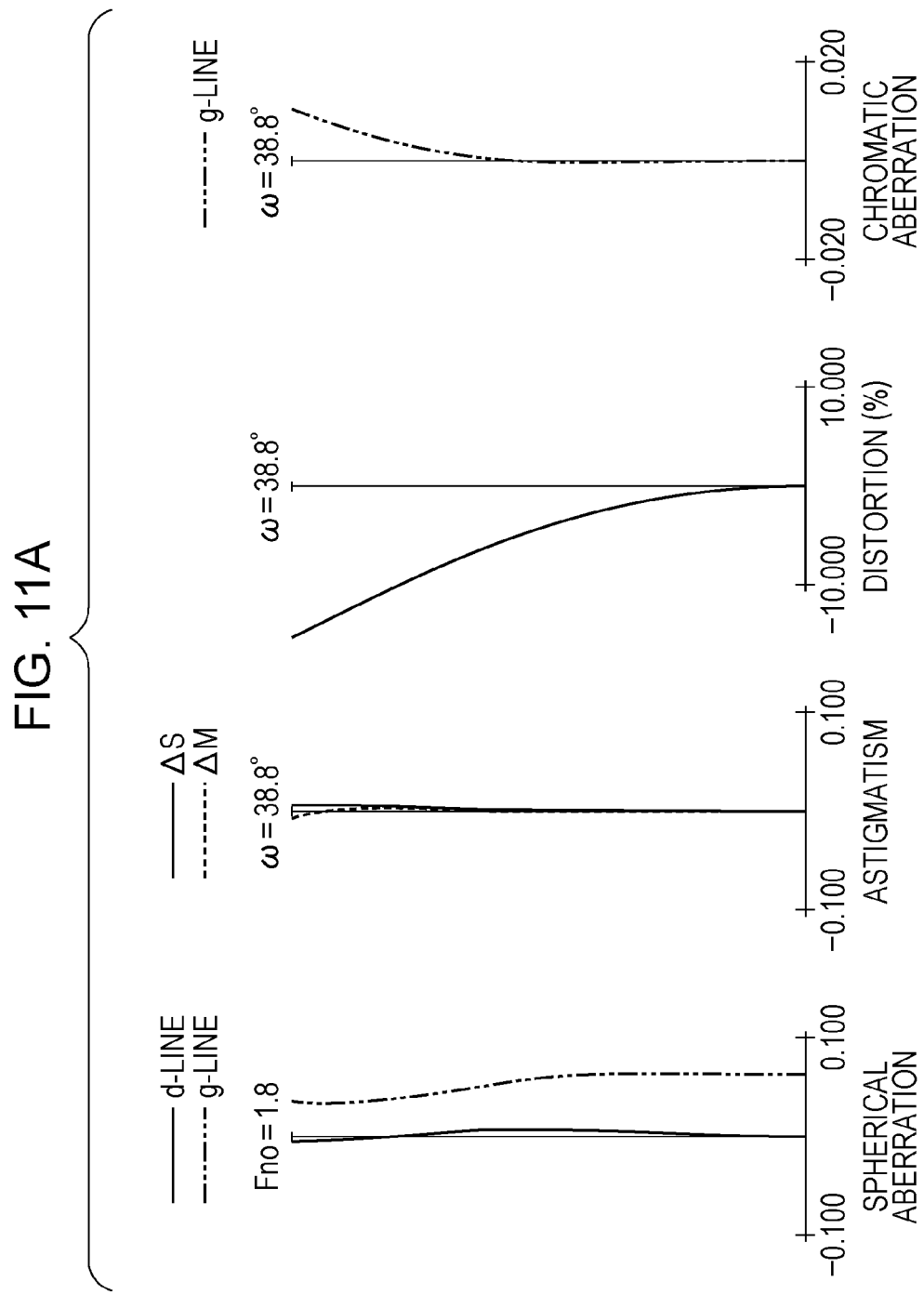

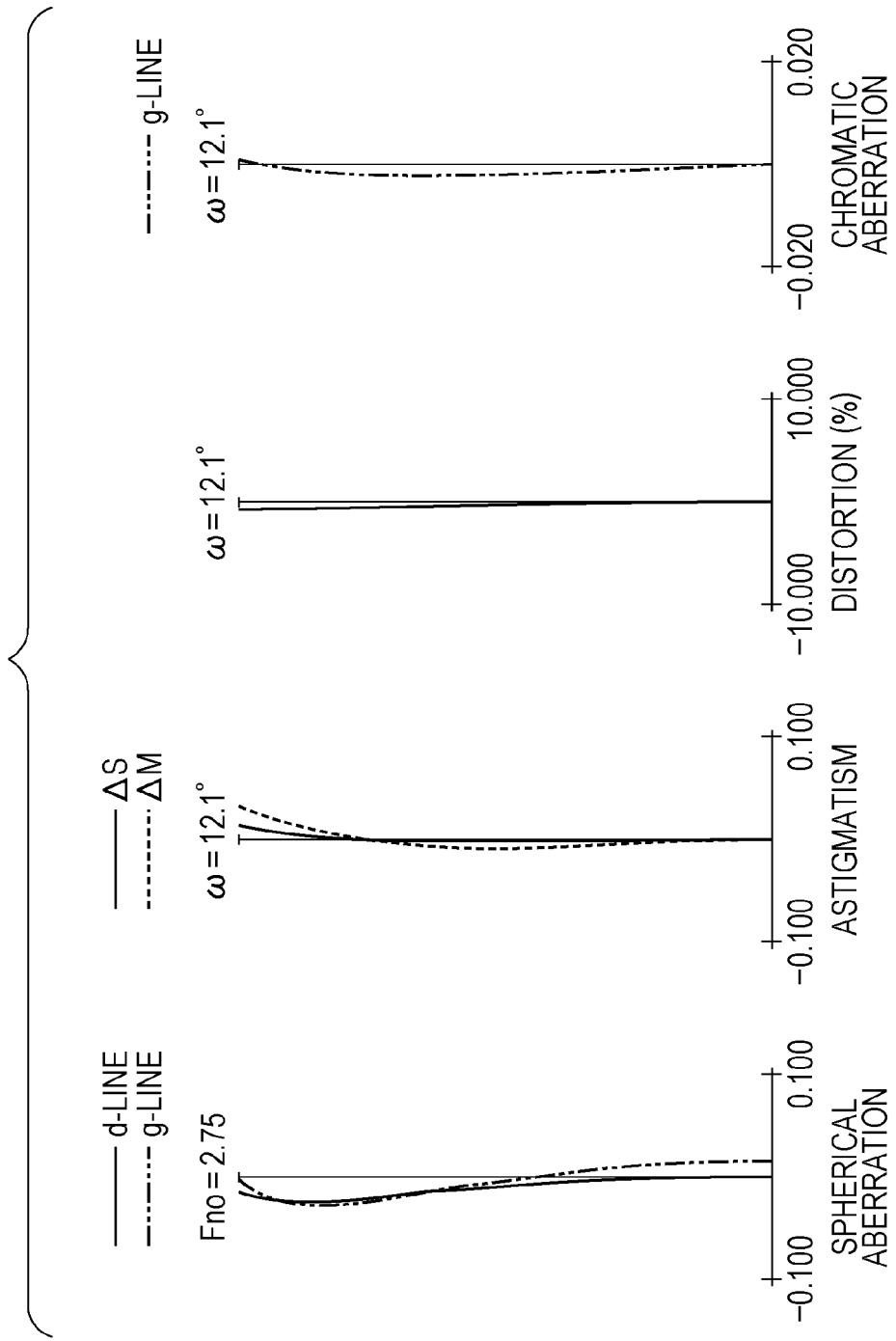

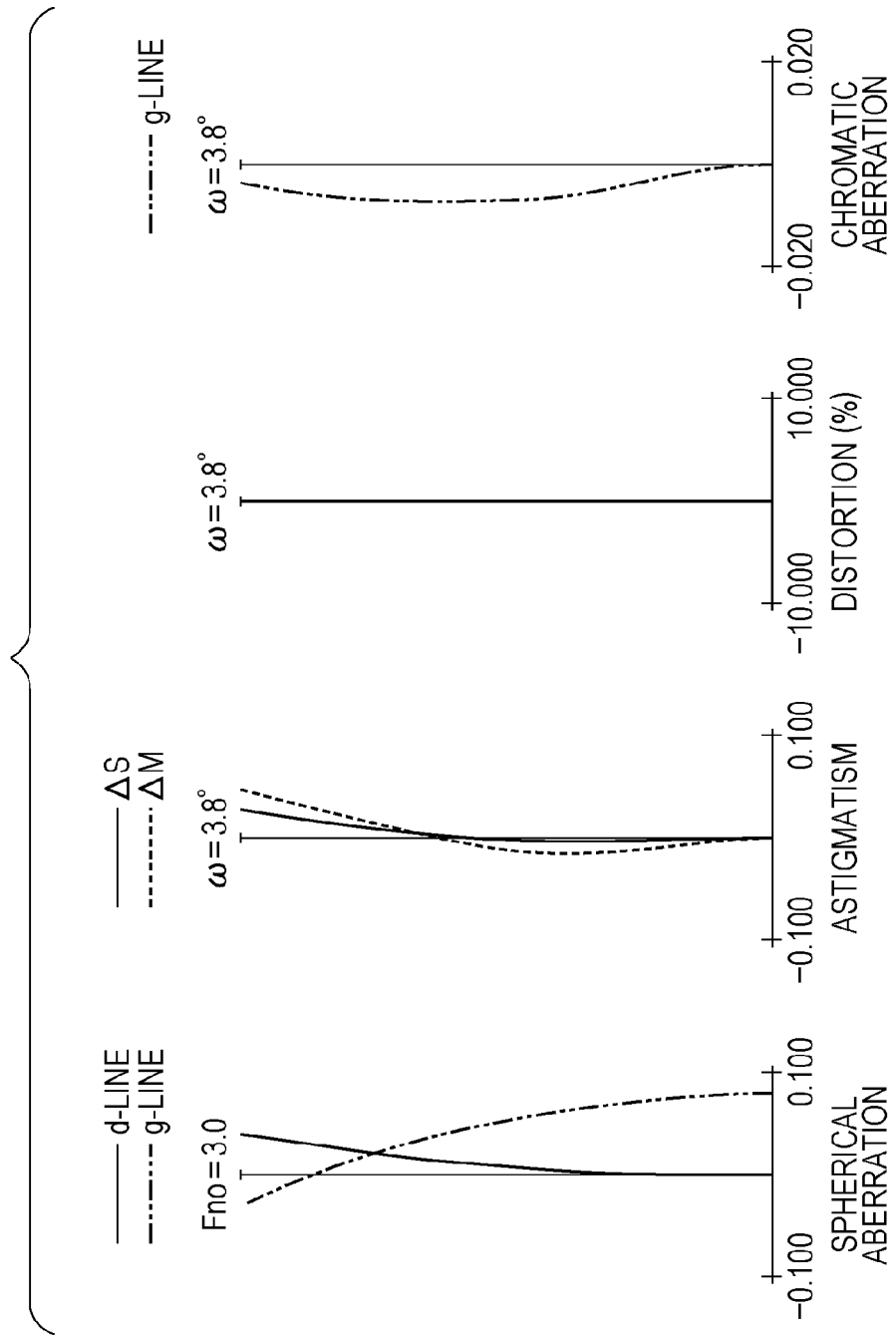

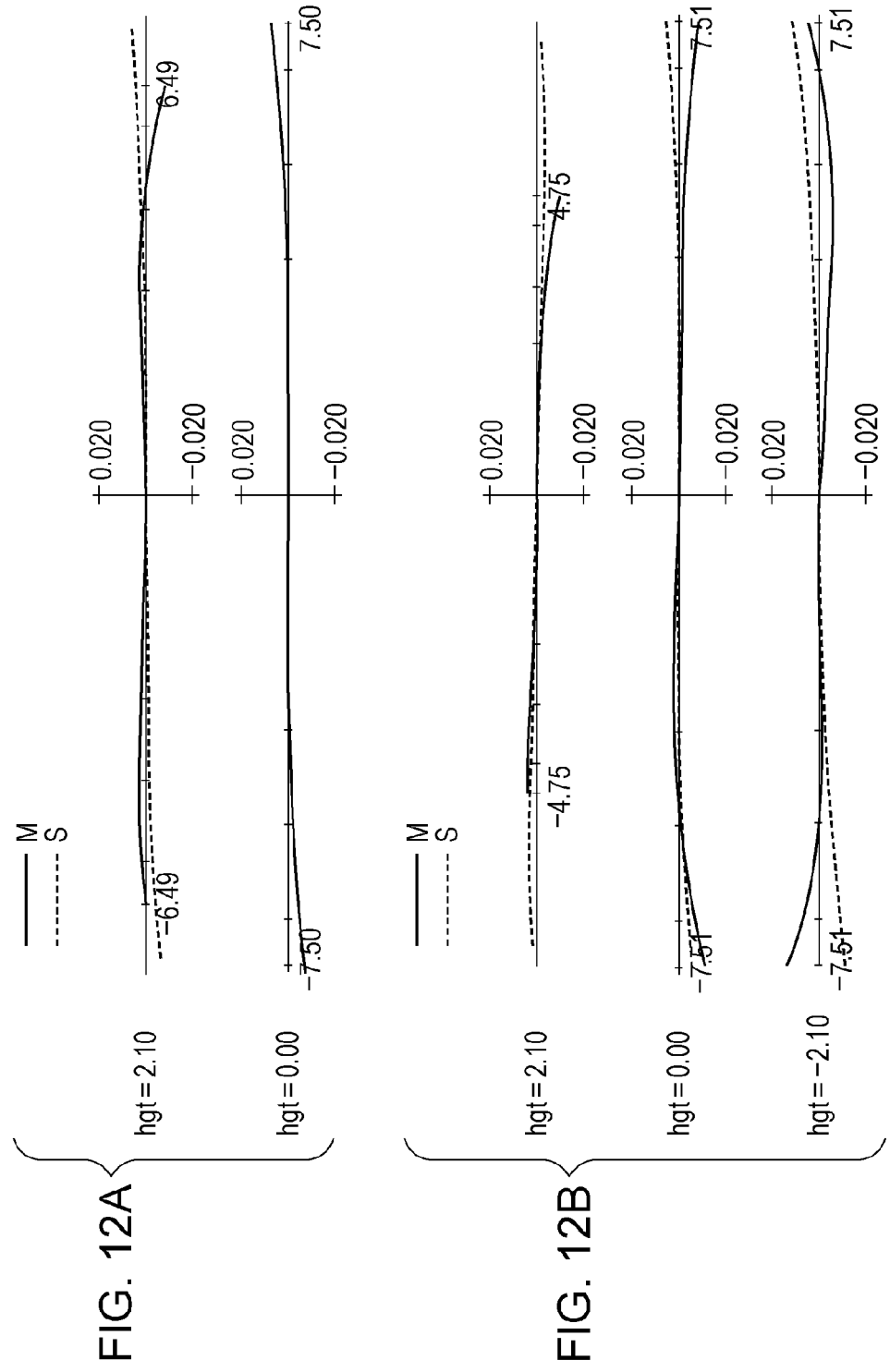

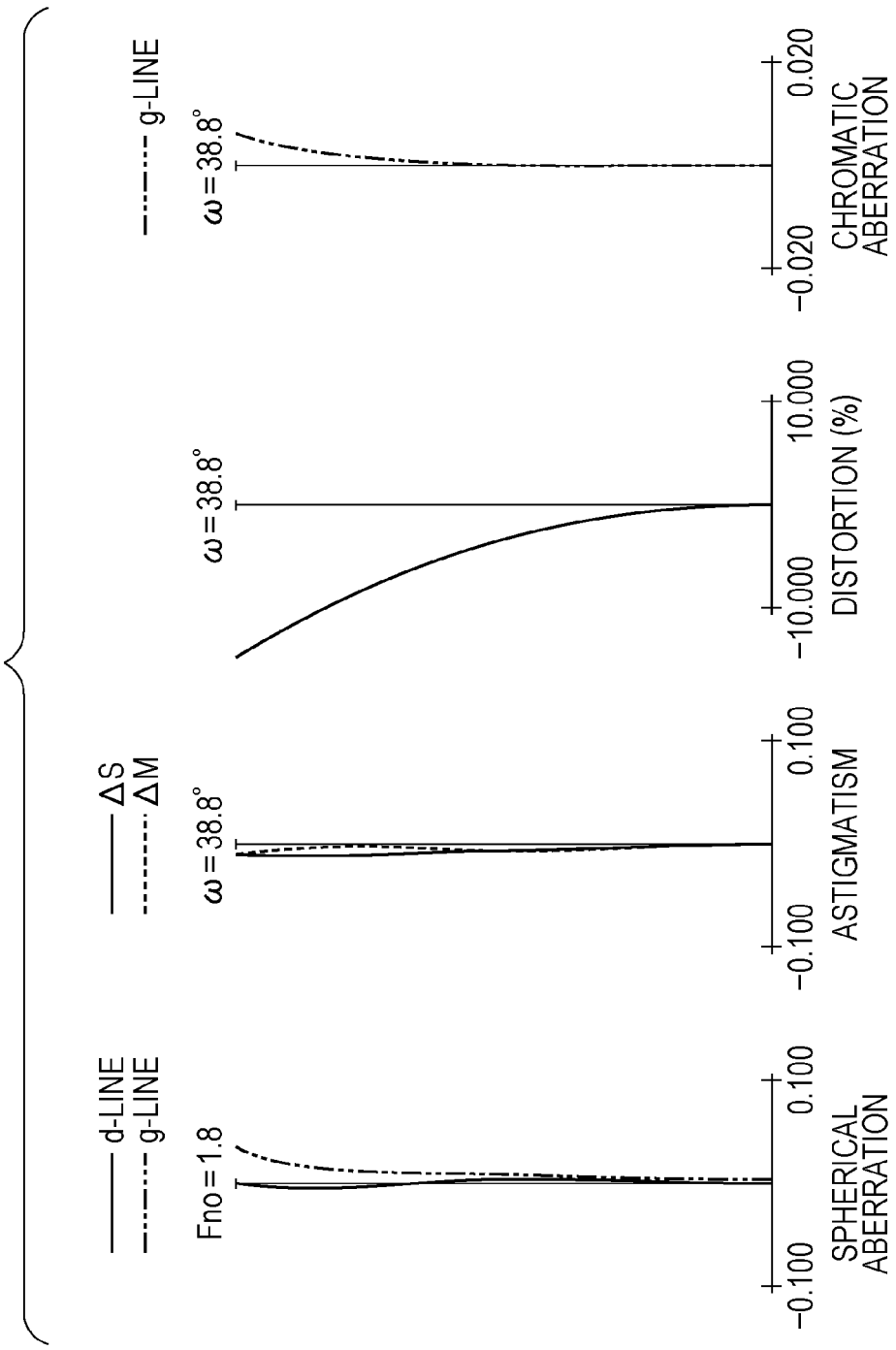

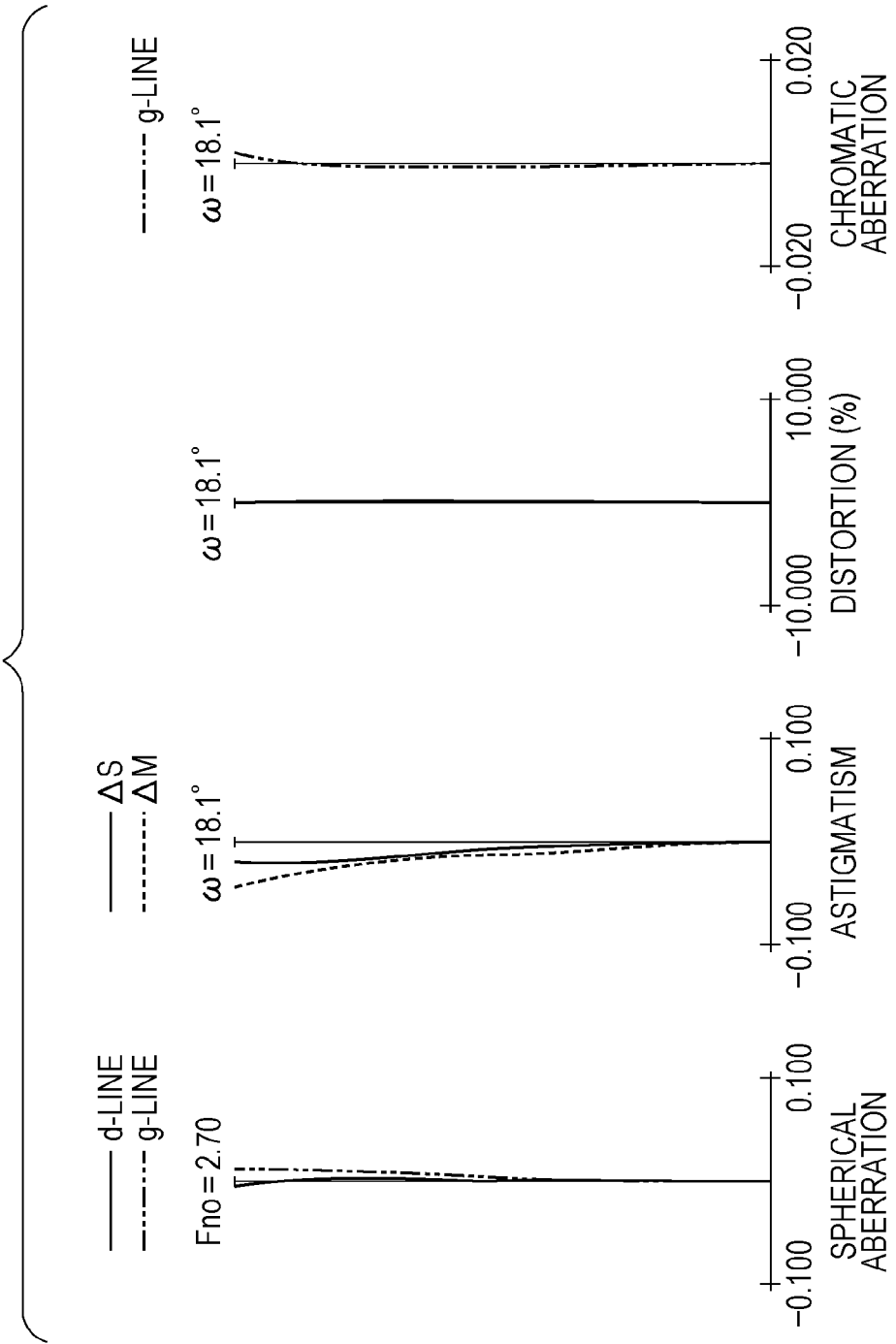

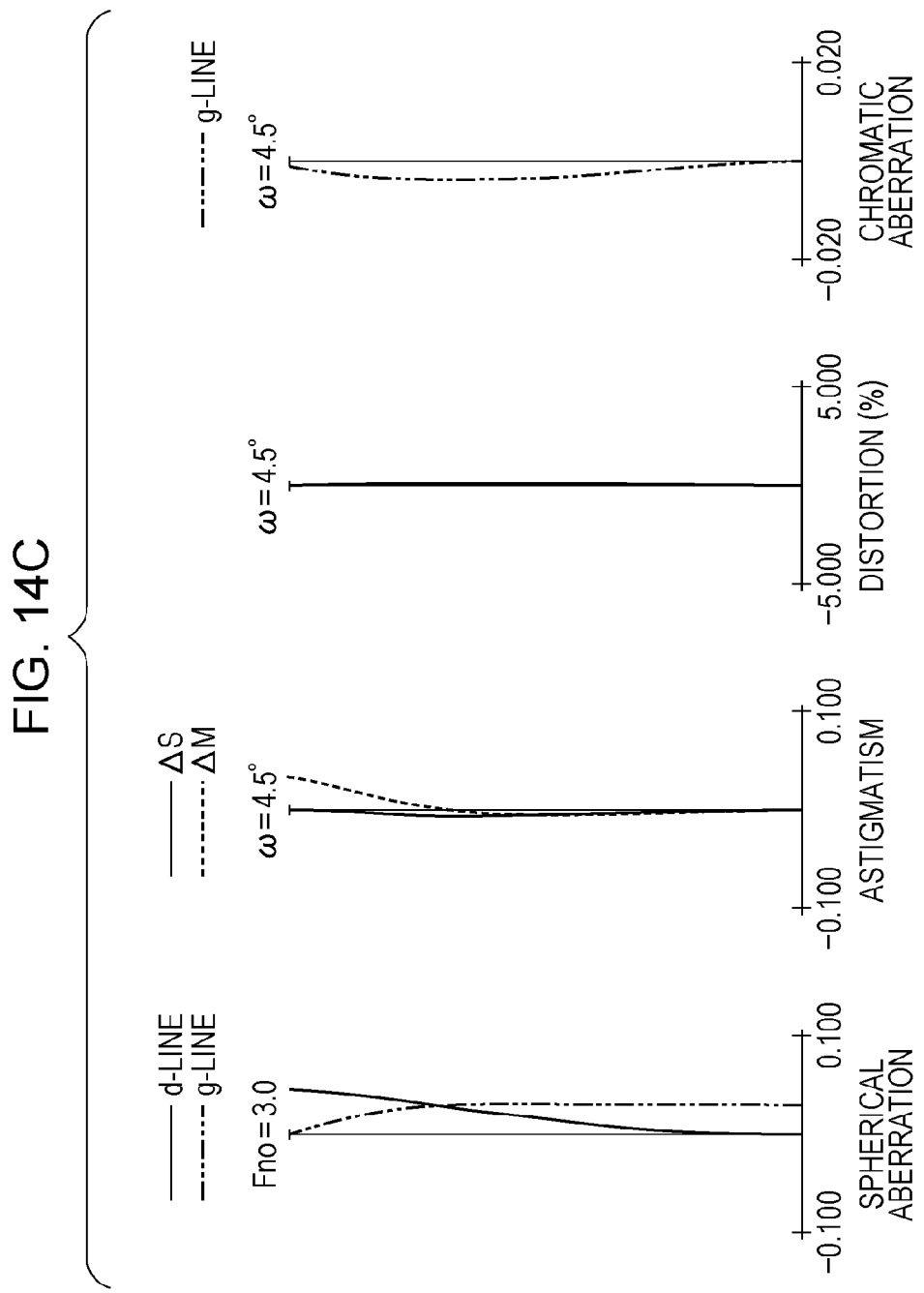

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same, which is in particular suitable for an image pickup apparatus using a solid-state image pickup element, such as a video camera, an electronic still camera, a broadcasting camera, and a surveillance camera, and for a silver halide camera.

2. Description of the Related Art

Zoom lenses for use in image pickup apparatuses, such as a video camera, a digital still camera, a broadcasting camera, and a surveillance camera that use a solid-state image pickup element, and a camera that uses a silver-halide film require to have a compact optical system, a high zoom ratio, and high resolution. A known example of zoom lenses that meet such requirements is a five-unit zoom lens composed of lens units having positive, negative, positive, negative, and positive refractive powers in order from the object side to the image side (U.S. Pat. No. 7,177,092). Another known example is a six-unit zoom lens composed of six lens units having positive, negative, positive, negative, positive, and negative refractive powers in order from the object side to the image side (U.S. Pat. No. 6,124,972).

Another known zoom lens has an image stabilizing performance for correcting image blur that occurs when incidental vibration is transmitted to the zoom lens due to hand shake etc. by moving part of the lens units in the direction perpendicular to the optical axis. The configuration in which a lens unit that does not move on the optical axis when zooming is used as a compensation lens unit for image stabilization can simplify the image stabilizing mechanism, which is effective in reducing the size of the zoom lens. Known examples of the zoom lens with the five unit configuration described above have an image stabilizing performance for correcting image blur by moving a fourth lens unit having negative refractive power, which does not move for zooming, in the direction perpendicular to the optical axis (U.S. Pat. Nos. 7,336,426 and 7,609,446).

In general, the amount of image blur on an image plane due to hand shake etc. is proportional to the focal length of the entire lens system. For a zoom lens, the amount of image blue is larger at the telephoto end, which requires to increase the image stabilizing correction angle at the telephoto end. Increasing the moving distance of an image stabilizing compensation lens unit in the direction perpendicular to the optical axis can increase the image stabilizing correction angle, which however causes significant eccentric aberrations, such as one-side defocusing, eccentric coma aberration, and eccentric chromatic aberration, thus degrading the image quality due to image stabilization. Therefore, in many zoom lenses, an upper limit to the image blur correction amount at the telephoto end is generally about 0.3 degrees at the field of view.

Increasing the number of lenses that constitute a compensation lens unit can further decrease such eccentric aberrations, which however increases the weight, and thus requires a large torque for electrical driving, thus increasing the size of the entire optical system. Therefore, it is important for a zoom lens having an image stabilizing performance to have a compensation lens unit with an appropriate configuration while the entire system is compact. In particular for the foregoing five-unit and six-unit zoom lenses, to maintain a high optical performance during image stabilization while reducing the size of the entire lens system, it is important to suitably set the configuration of the fourth lens unit for image stabilization and the lens units at the image side with respect to the fourth lens unit. Otherwise, it is difficult to provide a zoom lens having a high optical performance during image stabilization while reducing the size of the entire system.

SUMMARY OF THE INVENTION

The present invention provides a zoom lens in which image blur correction is easy with a compact and lightweight compensation lens unit for correcting image blur, and in which a large image blur angle at the telephoto end can also be corrected while a high optical performance is maintained.

A zoom lens according to an aspect of the present invention includes, a first lens unit having positive refractive power; a second lens unit having negative refractive power; a third lens unit having positive refractive power; a fourth lens unit having negative refractive power, a fifth lens unit having positive refractive power, wherein the first, second, third, fourth and fifth lens units are arranged in order from an object side to an image plane side along an optical axis of the zoom lens, wherein the fourth lens unit includes a positive lens and a negative lens and is configured to move in a direction having a component perpendicular to the optical axis so as to move an imaging position in the direction perpendicular to the optical axis; and wherein, during zooming, the fourth lens unit does not move, and the second, third, and fifth lens units move in the direction of the optical axis; and the following conditional expressions are satisfied:

$$0.1 < |f4/ft| < 0.7$$

$$0.8 < |f4p \cdot (n4p-1)/f4| < 4.0$$

$$0.01 < |Dm \cdot (1-\beta4t) \cdot \beta rt|/ft < 0.08$$

where ft is the focal length of the zoom lens at the telephoto end; f4 is the focal length of the fourth lens unit; f4p is the focal length of the positive lens of the fourth lens unit; n4p is the refractive index of the material of the positive lens of the fourth lens unit; Dm is the maximum moving distance, at the telephoto end, of the component of the fourth lens unit perpendicular to the optical axis; β4t is the lateral magnification of the fourth lens unit at the telephoto end; and βrt is the lateral magnification, at the telephoto end, of a lens system disposed at the image plane side with respect to the fourth lens unit.

Further features of the present invention will become apparent from the following description of exemplary embodiments with reference to the attached drawings.

BRIEF DESCRIPTION OF THE DRAWINGS

FIG. 1 is a cross-sectional view, at a wide-angle end, of a zoom lens according to a first embodiment of the present invention.

FIG. 2A is an aberration diagram, at the wide-angle end, of the zoom lens of the first embodiment of the present invention.

FIG. 2C is an aberration diagram, at a telephoto end, of the zoom lens of the first embodiment of the present invention.

FIG. 3A is a lateral aberration diagram, at the telephoto end, before image blur correction of Numerical Example 1 of the present invention.

FIG. 3B is a lateral aberration diagram, at the telephoto end, after image blur correction of Numerical Example 1 of the present invention.

FIG. 5A is an aberration diagram, at the wide-angle end, of the zoom lens of the second embodiment of the present invention.

FIG. 5B is an aberration diagram, at the intermediate zooming position, of the zoom lens of the second embodiment of the present invention.

FIG. 5C is an aberration diagram, at the telephoto end, of the zoom lens of the second embodiment of the present invention.

FIG. 6A is a lateral aberration diagram, at the telephoto end, before image blur correction of Numerical Example 2 of the present invention.

FIG. 6B is a lateral aberration diagram, at the telephoto end, after image blur correction of Numerical Example 2 of the present invention.

FIG. 8A is an aberration diagram, at the wide-angle end, of the zoom lens of the third embodiment of the present invention.

FIG. 8B is an aberration diagram, at the intermediate zooming position, of the zoom lens of the third embodiment of the present invention.

FIG. 8C is an aberration diagram, at the telephoto end, of the zoom lens of the third embodiment of the present invention.

FIG. 11A is an aberration diagram, at the wide-angle end, of the zoom lens of the fourth embodiment of the present invention.

FIG. 11B is an aberration diagram, at the intermediate zooming position, of the zoom lens of the fourth embodiment of the present invention.

FIG. 11C is an aberration diagram, at the telephoto end, of the zoom lens of the fourth embodiment of the present invention.

FIG. 12A is a lateral aberration diagram, at the telephoto end, before image blur correction of Numerical Example 4 of the present invention.

FIG. 12B is a lateral aberration diagram, at the telephoto end, after image blur correction of Numerical Example 4 of the present invention.

FIG. 14A is an aberration diagram, at the wide-angle end, of the zoom lens of the fifth embodiment of the present invention.

FIG. 14B is an aberration diagram, at the intermediate zooming position, of the zoom lens of the fifth embodiment of the present invention.

FIG. 14C is an aberration diagram, at the telephoto end, of the zoom lens of the fifth embodiment of the present invention.

DESCRIPTION OF THE EMBODIMENTS

Zoom lenses having an image stabilizing performance and image pickup apparatuses including the same according to some embodiments of the present invention will be described hereinbelow. A zoom lens according to an embodiment of the present invention includes, in order from the object side to the image plane side, a first lens unit having positive refractive power, a second lens unit having negative refractive power, a third lens unit having positive refractive power, a fourth lens unit having negative refractive power, and a fifth lens unit having positive refractive power. During zooming, the fourth lens unit does not move, and the second, third, and fifth lens units move in the direction of the optical axis. Another embodiment of the present invention has a lens unit having negative refractive power, which is not moved during zooming, at the image side with respect to the fifth lens unit.

Figure 2B:
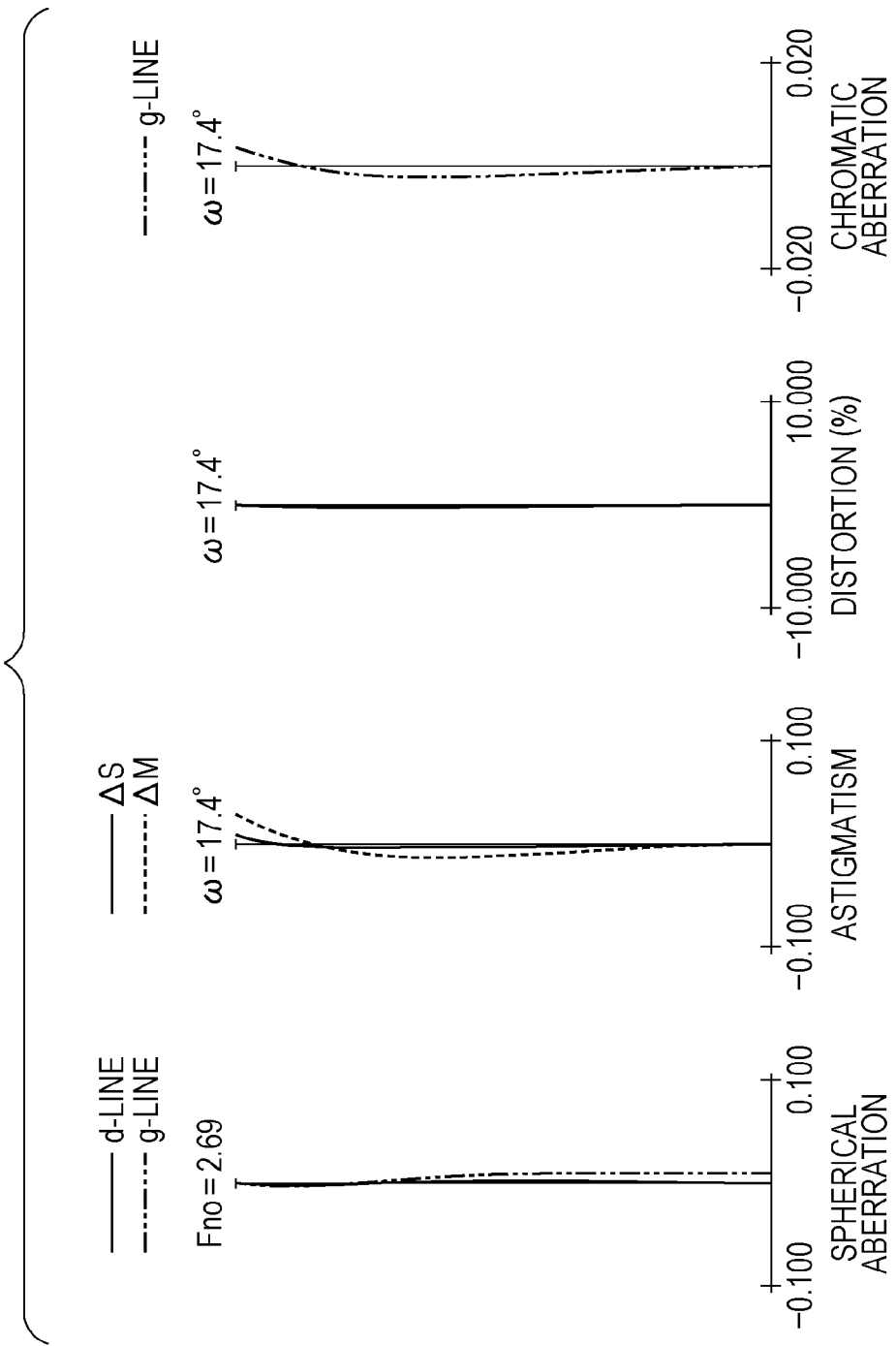
FIG. 2B is an aberration diagram, at an intermediate zooming position, of the zoom lens of the first embodiment of the present invention.

FIG. 1 is a cross-sectional view, at the wide-angle end (short focal length end), of a zoom lens according to a first embodiment of the present invention. FIGS. 2A, 2B, and 2C are aberration diagrams, at the wide-angle end, an intermediate zooming position, the telephoto end (long focal length end), respectively, of the zoom lens of the first embodiment. FIGS. 3A and 3B are lateral aberration diagrams, at the telephoto end, before and after image blur correction of the first embodiment of the present invention, respectively. The lateral aberration diagram after image blur correction shows an aberration when an image blur correction angle is 1.5°.

Figure 4:
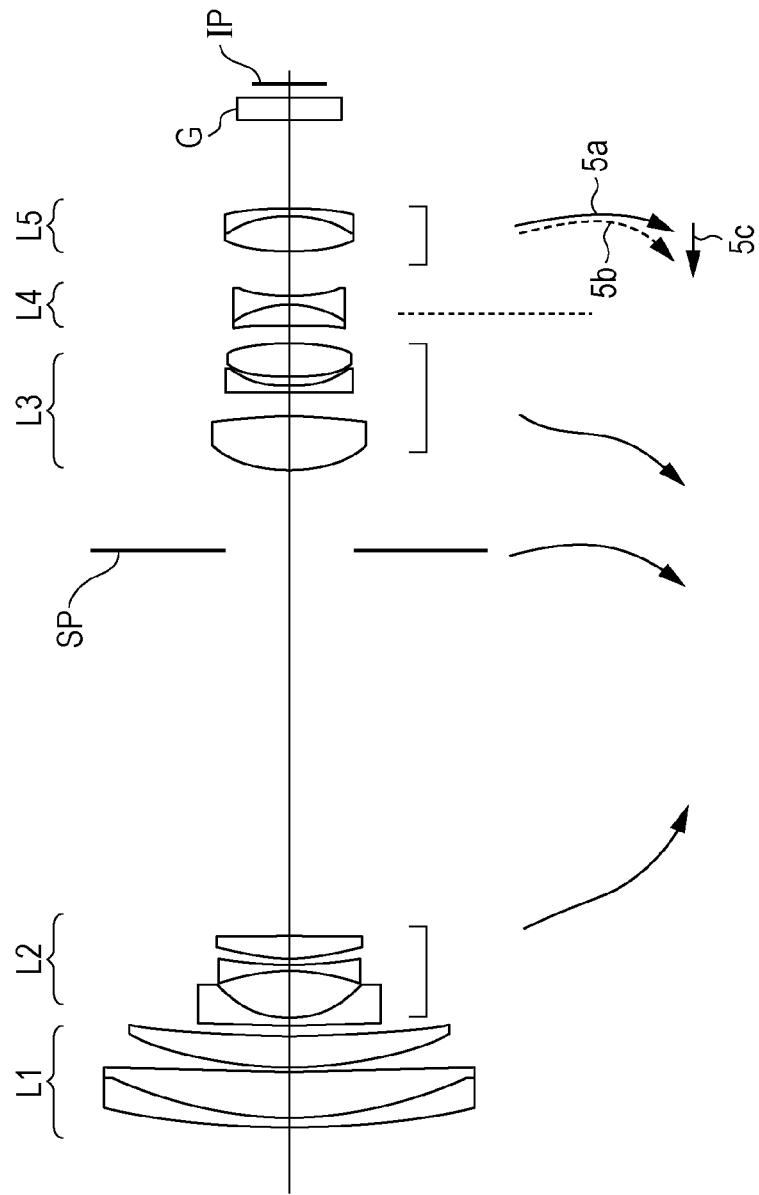
FIG. 4 is a cross-sectional view, at the wide-angle end, of a zoom lens according to a second embodiment of the present invention.

FIG. 4 is a cross-sectional view, at the wide-angle end, of a zoom lens according to a second embodiment of the present invention. FIGS. 5A, 5B, and 5C are aberration diagrams, at the wide-angle end, an intermediate zooming position, the telephoto end, respectively, of the zoom lens of the second embodiment. FIGS. 6A and 6B are lateral aberration diagrams, at the telephoto end, before and after image blur correction of the second embodiment of the present invention, respectively. The lateral aberration diagram after image blur correction shows an aberration when an image blur correction angle is 2.0°.

Figure 7:
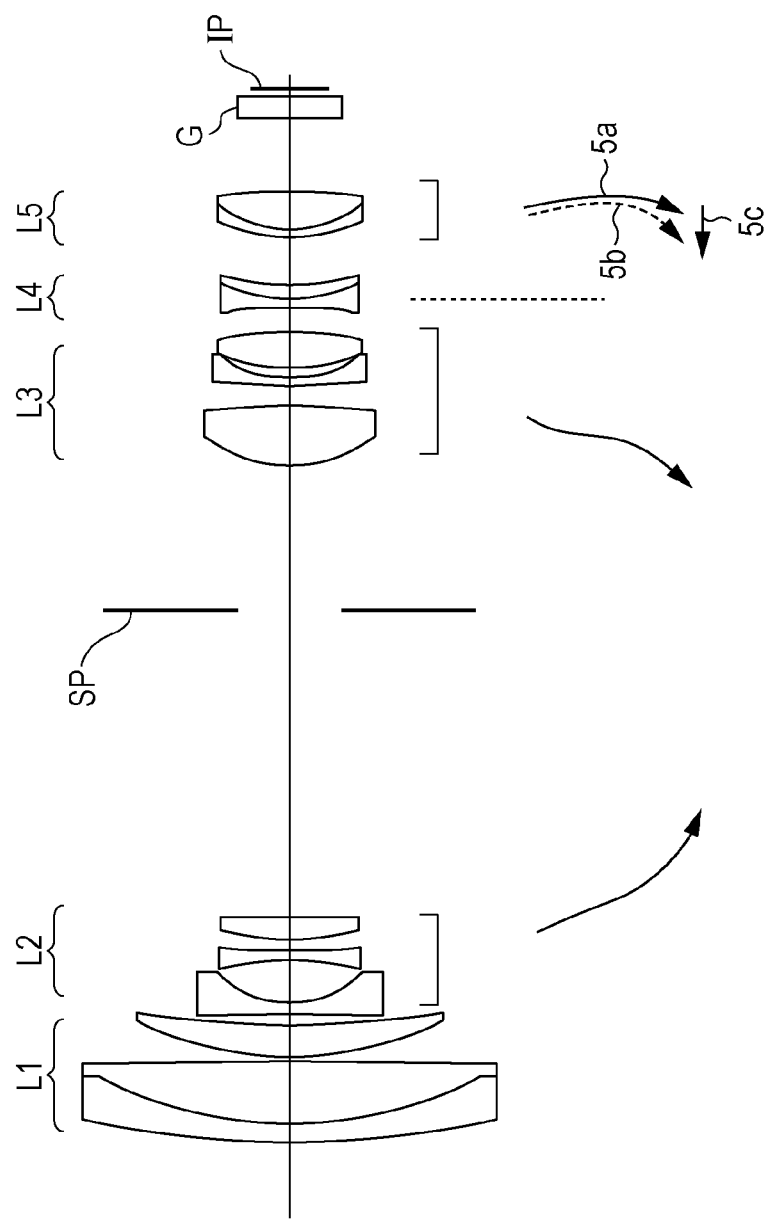
FIG. 7 is a cross-sectional view, at the wide-angle end, of a zoom lens according to a third embodiment of the present invention.
Figure 9A:
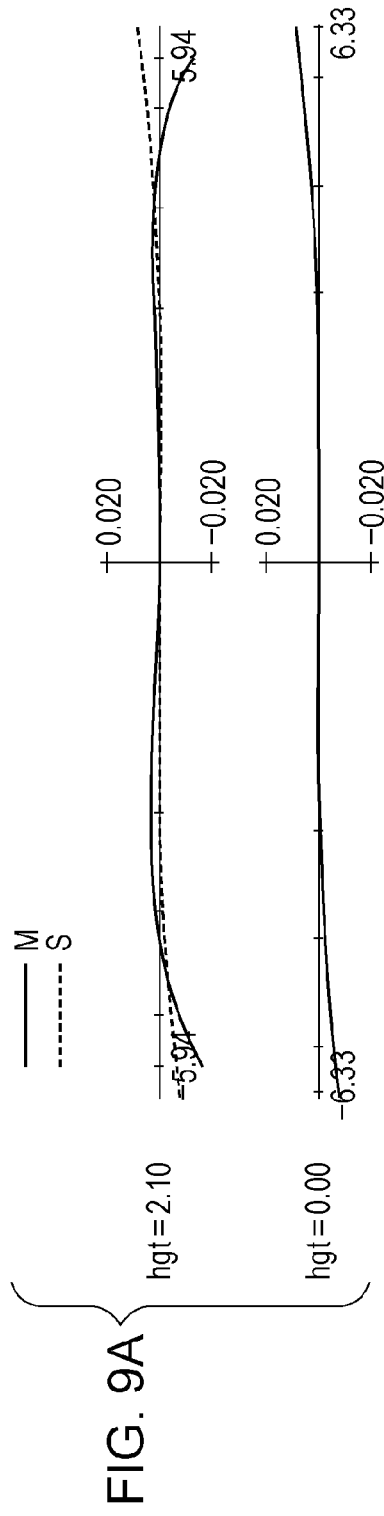
FIG. 9A is a lateral aberration diagram, at the telephoto end, before image blur correction of Numerical Example 3 of the present invention.
Figure 9B:
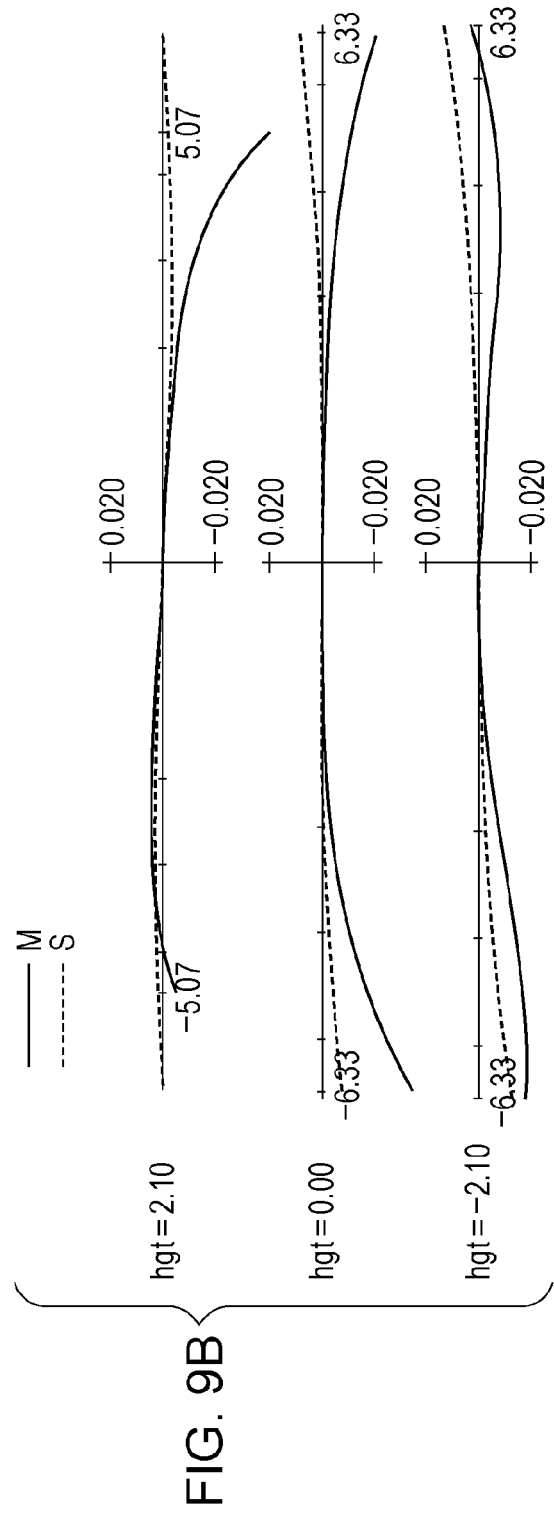
FIG. 9B is a lateral aberration diagram, at the telephoto end, after image blur correction of Numerical Example 3 of the present invention.

FIG. 7 is a cross-sectional view, at the wide-angle end, of a zoom lens according to a third embodiment of the present invention. FIGS. 8A, 8B and 8C are aberration diagrams, at the wide-angle end, an intermediate zooming position, the telephoto end, respectively, of the zoom lens of the third embodiment. FIGS. 9A and 9B are lateral aberration diagrams, at the telephoto end, before and after image blur correction of the third embodiment of the present invention, respectively. The lateral aberration diagram after image blur correction shows an aberration when an image blur correction angle is 1.0°.

Figure 10:
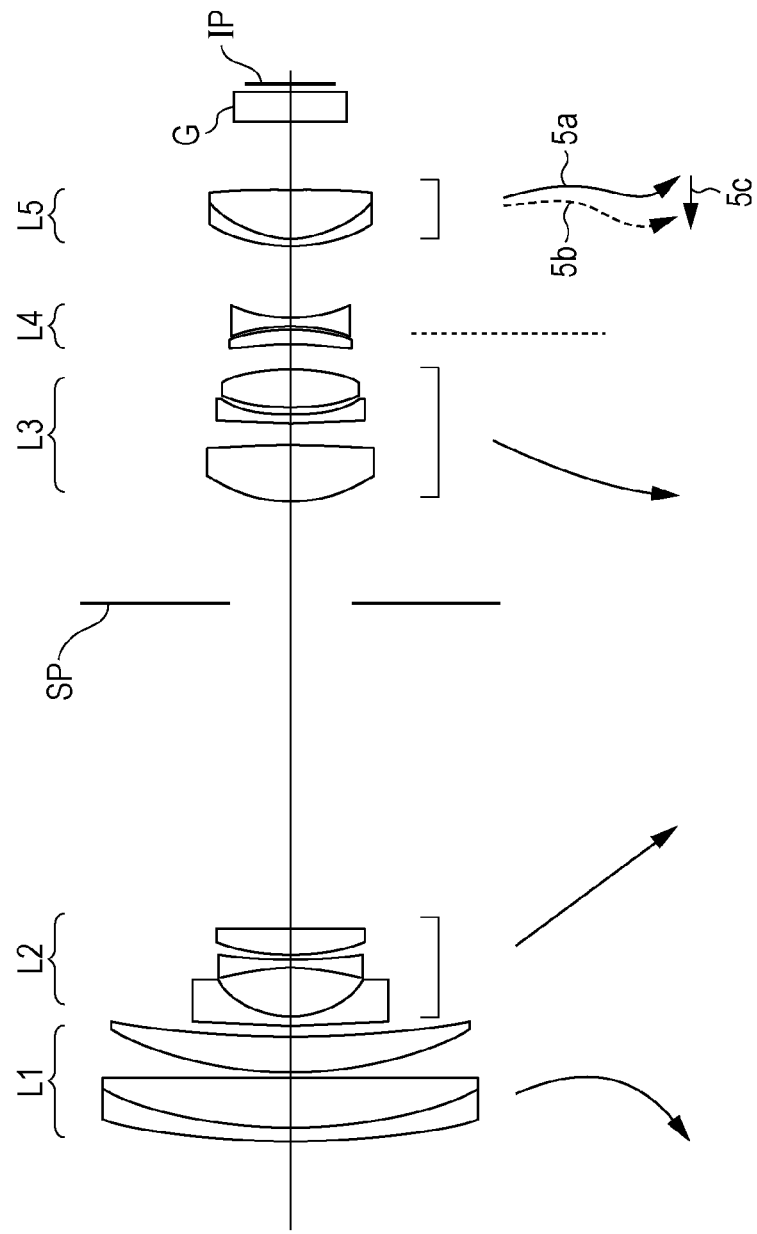
FIG. 10 is a cross-sectional view, at the wide-angle end, of a zoom lens according to a fourth embodiment of the present invention.

FIG. 10 is a cross-sectional view, at the wide-angle end, of a zoom lens according to a fourth embodiment of the present invention. FIGS. 11A, 11B, and 11C are aberration diagrams, at the wide-angle end, an intermediate zooming position, the telephoto end, respectively, of the zoom lens of the fourth embodiment. FIGS. 12A and 12B are lateral aberration diagrams, at the telephoto end, before and after image blur correction of the fourth embodiment of the present invention, respectively. The lateral aberration diagram after image blur correction shows an aberration when an image blur correction angle is 1.2°.

Figure 13:
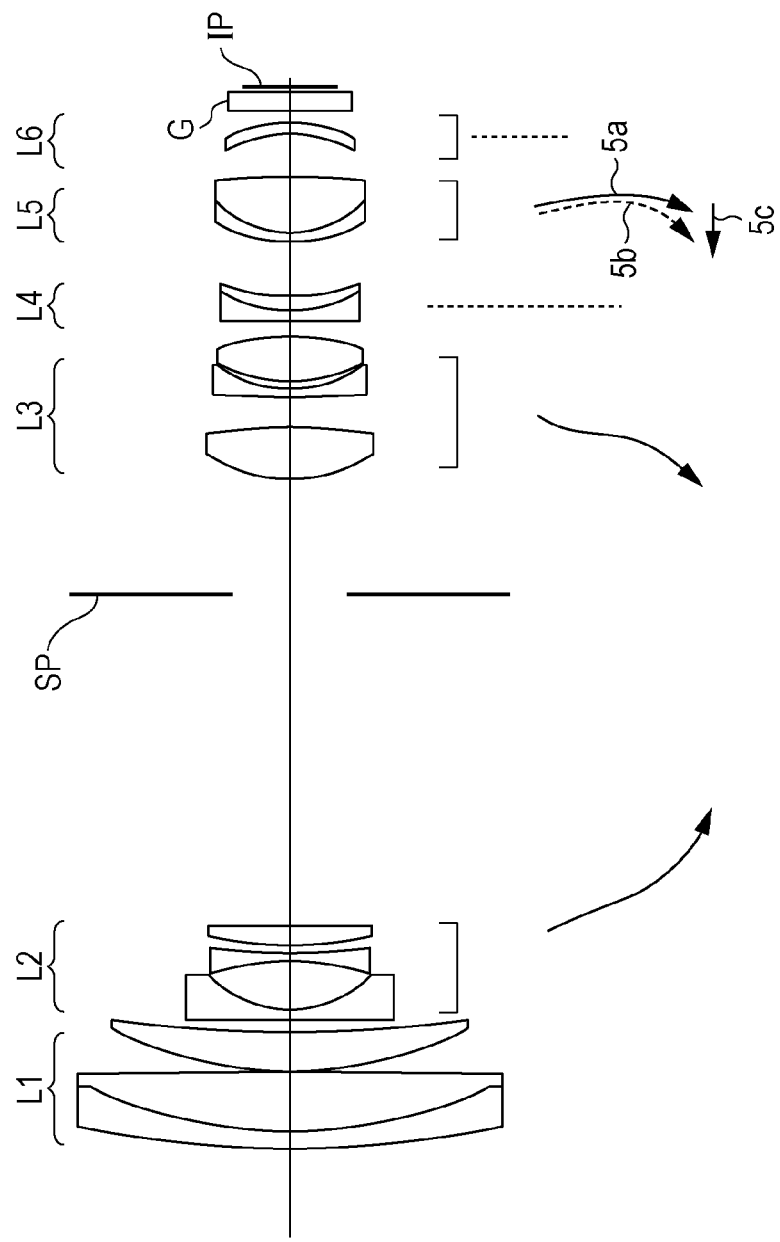
FIG. 13 is a cross-sectional view, at the wide-angle end, of a zoom lens according to a fifth embodiment of the present invention.
Figure 15A:
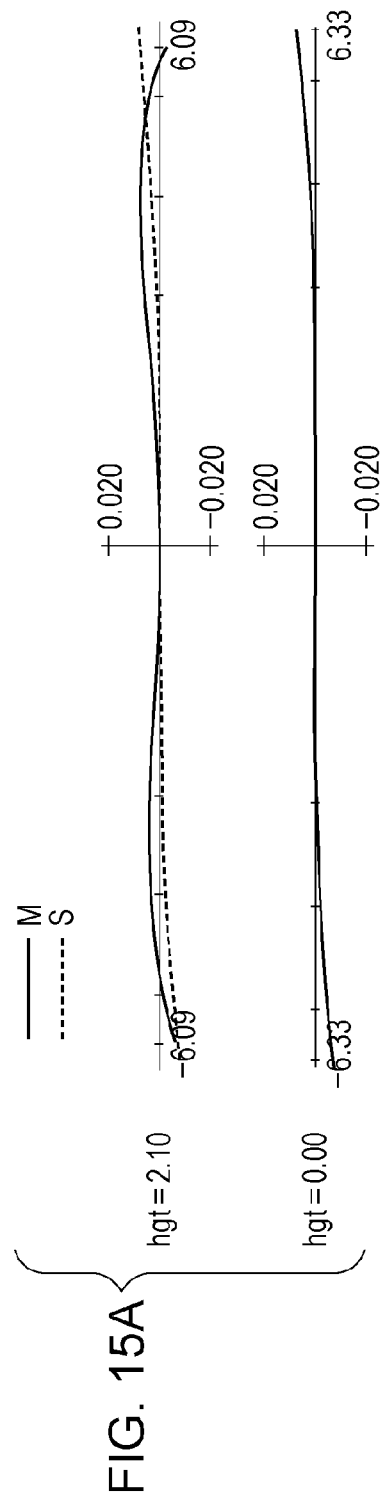
FIG. 15A is a lateral aberration diagram, at the telephoto end, before image blur correction of Numerical Example 5 of the present invention.
Figure 15B:
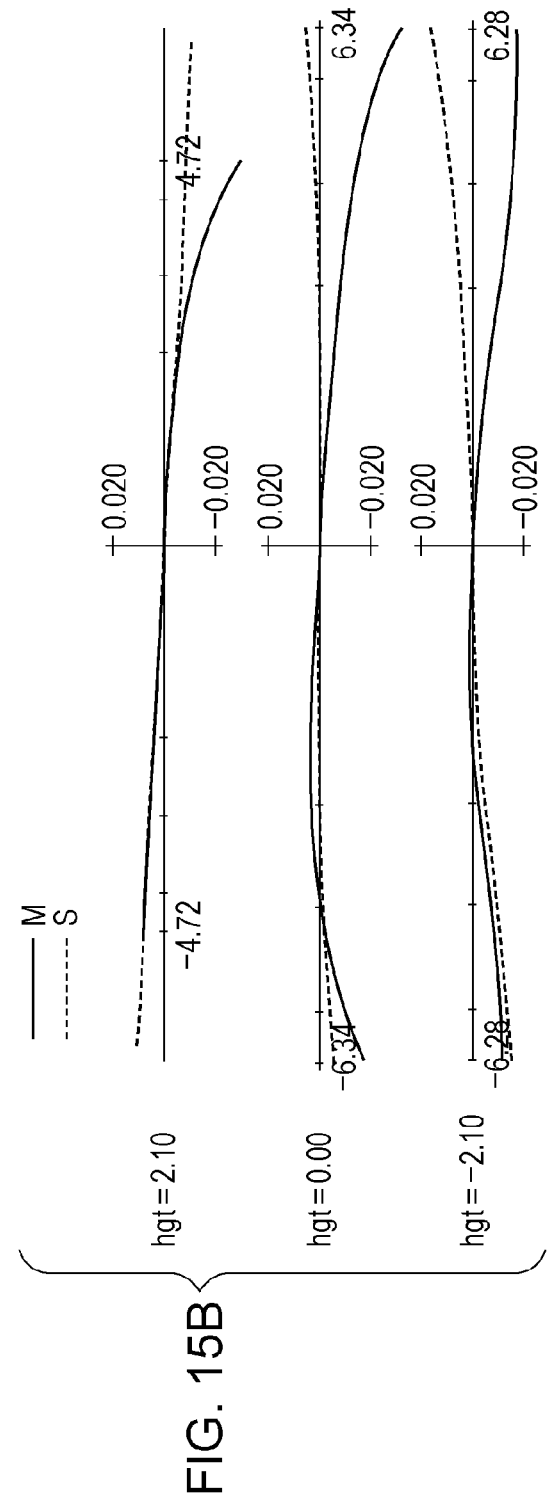
FIG. 15B is a lateral aberration diagram, at the telephoto end, after image blur correction of Numerical Example 5 of the present invention.

FIG. 13 is a cross-sectional view, at the wide-angle end, of a zoom lens according to a fifth embodiment of the present invention. FIGS. 14A, 14B, and 14C are aberration diagrams at the wide-angle end, an intermediate zooming position, the telephoto end, respectively, of the zoom lens of the fifth embodiment. FIGS. 15A and 15B are lateral aberration diagrams, at the telephoto end, before and after image blur correction of the fifth embodiment of the present invention, respectively. The lateral aberration diagram after image blur correction shows an aberration when an image blur correction angle is 1.8°.

Figure 16:
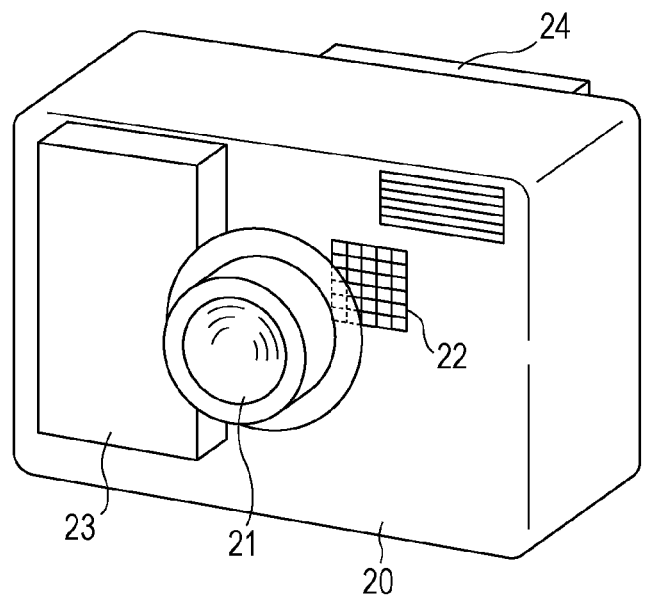
FIG. 16 is a schematic diagram of a relevant part of a digital camera equipped with a zoom lens according to an embodiment of the present invention.
Figure 17:
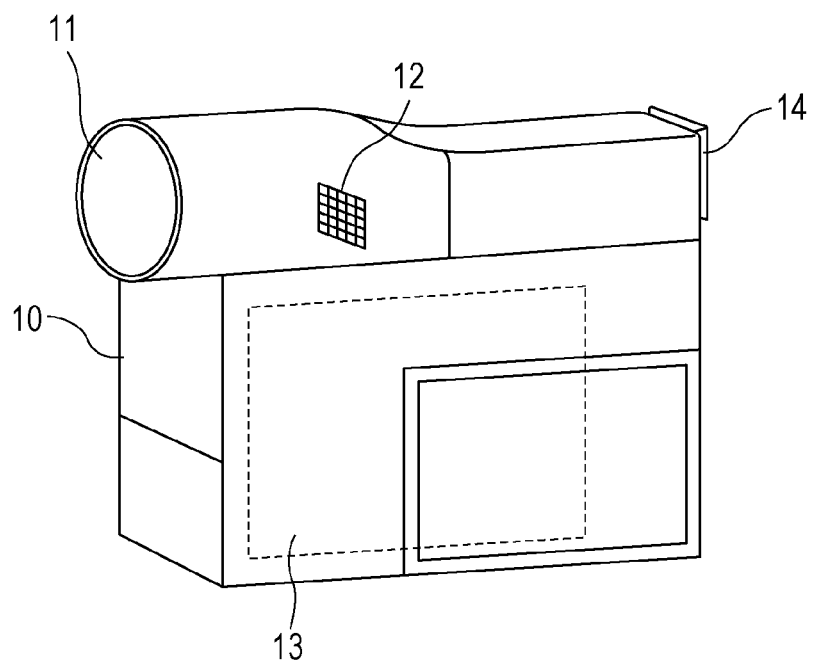
FIG. 17 is a schematic diagram of a relevant part of a video camera equipped with a zoom lens according to an embodiment of the present invention.

FIGS. 16 and 17 are schematic diagrams of relevant parts of cameras (image pickup apparatuses) equipped with a zoom lens according to an embodiment of the present invention. The zoom lenses of the embodiments are image-taking optical systems for use in image pickup apparatuses, such as a video camera, a digital camera, and a silver-halide film camera. In the cross-sectional views of the lenses, the left is the object side (front), and the right is the image side (rear).

In the cross-sectional views of the lenses according to the first to fourth embodiments in FIGS. 1, 4, 7, and 10, reference sign L1 denotes a first lens unit having positive refractive power; L2 denotes a second lens unit having negative refractive power; L3 denotes a third lens unit having positive refractive power; L4 denotes a fourth lens unit having negative refractive power; and L5 denotes a fifth lens unit having positive refractive power. In the cross-sectional view of the lenses according to the fifth embodiment of FIG. 13, reference sign L1 denotes a first lens unit having positive refractive power; L2 denotes a second lens unit having negative refractive power; L3 denotes a third lens unit having positive refractive power; L4 denotes a fourth lens unit having negative or positive refractive power; L5 denotes a fifth lens unit having positive refractive power; and L6 denotes a sixth lens unit having negative refractive power.

In the lens cross-sectional views, reference sign SP denotes an aperture stop; G denotes an optical block corresponding to an optical filter, a faceplate, a crystal low-pass filter, or an infrared cut filter; and IP denotes an image plane. When used as a photographing optical system of a video camera or a digital still camera, the image plane IP corresponds to an image pickup surface of a solid-state image pickup element (photoelectric conversion element), such as a CCD sensor and a CMOS sensor; and when used as a silver-halide film camera, the IP corresponds to a photosensitive surface corresponding to a film surface.

The spherical aberration diagrams show d-line (wavelength: 587.56 nm) and g-line (wavelength: 435.8 nm). In the astigmatism diagrams, reference sign $\Delta M$ denotes a meridional image plane and $\Delta S$ denotes a sagittal image plane. Lateral chromatic aberration is indicated by g-line.

In the lateral aberration diagrams, reference sign M denotes the lateral aberration of meridional plane light beams of d-line; S denotes the lateral aberration of sagittal plane light beams of d-line; hgt denotes an image height; ω denotes a half angle of view (a value half an image-capturing angle of view); and Fno denotes F-number. In the embodiments below, the wide-angle end and the telephoto end indicate zooming positions when a scaling lens unit is located at one of both ends in a movable range on the optical axis of the system. In the embodiments, the arrows indicate moving loci of the lenses when zooming or focusing from the wide-angle end to the telephoto end.

The zoom lenses of the first to fourth embodiments each include, in order from the object side to the image side, the first lens unit L1 having positive refractive power, the second lens unit L2 having negative refractive power, the aperture stop SP, the third lens unit L3 having positive refractive power, the fourth lens unit L4 having negative refractive power, and the fifth lens unit L5 having positive refractive power. In the fifth embodiment, the zoom lens includes the first lens unit L1 having positive refractive power, the second lens unit L2 having negative refractive power, the aperture stop SP, the third lens unit L3 having positive refractive power, the fourth lens unit L4 having negative refractive power, the fifth lens unit L5 having positive refractive power, and the sixth lens unit L6 having negative refractive power.

In the foregoing embodiments, when zooming from the wide-angle end to the telephoto end, the fourth lens unit L4 does not move, the second lens unit L2 moves to the image plane side, the third lens unit L3 moves to the object side, and the fifth lens unit L5 moves to the image plane side in a convex locus. During zooming, the first lens unit L1 is fixed or moved. Fixing the first lens unit L1 during zooming can simplify the configuration of the zooming mechanism.

On the other hand, moving the first lens unit L1 when zooming can give a large scaling ratio to the second lens unit L2, thus facilitating the size reduction of the entire system and increasing the zoom ratio. The aperture stop SP is disposed between the second lens unit L2 and the third lens unit L3 and is fixed or moved during zooming. Fixing the aperture stop SP can simplify the focusing mechanism. On the other hand, moving the aperture stop SP can decrease an effective front lens diameter by decreasing the entrance pupil length in an intermediate zooming area from the wide-angle end in which the effective front lens diameter is determined and can easily cut unnecessary flare light in the intermediate zooming position.

The aperture stop diameter of the aperture stop SP is variable or fixed when zooming. Fixing the aperture stop diameter simplifies the control of the aperture diameter. On the other hand, in the case where the spherical aberration or flare is large at any zooming position, controlling the aperture stop diameter so that it is becomes small at the zooming position can effectively cut such unnecessary light, thus providing good optical characteristics. Although the aperture stop SP is disposed between the second lens unit L2 and the third lens unit L3, the aperture stop SP may be disposed in the third lens unit L3 or between the third lens unit L3 and the fourth lens unit L4.

In the embodiments, focusing from an object at infinity to a nearby object at the telephoto end is performed by moving the fifth lens unit L5 forward, as indicated by arrow 5c in the lens cross-sectional views. A solid-line curve 5a and a dotted-line curve 5b for the fifth lens unit L5 indicate moving loci for correcting changes in image plane due to zooming from the wide-angle end to the telephoto end when focusing on an object at infinity and a nearby object, respectively. The fifth lens unit L5 includes a positive lens and a negative lens. This allows eccentric chromatic aberration and eccentric coma aberration that occur in the fourth lens unit L4 during image blur correction to be effectively corrected as compared with a configuration constituted by one positive lens.

This can also facilitate reduction of changes in lateral chromatic aberration, curvature of fields, etc. due to focusing. Constituting the fifth lens unit L5 by three or more lenses makes it easier to correct changes in aberration due to image blur correction or focusing. However, this increases a driving torque necessary for zooming or focusing, which increases the size of the actuator, thus making it difficult to reduce the size of the entire optical system. Furthermore, when zooming from the wide-angle end to the telephoto end, the fifth lens unit L5 moves toward the image plane side in a convex locus.

The moving in such a locus can decrease the back focus, thus facilitating the size reduction of the entire optical system. The zoom lenses of the embodiments are a five-unit zoom lens or a six-unit zoom lens with the lens configuration as described above. In the embodiments, since a lens unit with negative refractive power having a divergent action is disposed at the image plane side with respect to the aperture, in particular, the effective front lens diameter can easily be reduced, as compared with a four-unit zoom lens including, for example, lens units with positive, negative, positive, and positive refractive powers. Zooming is performed while the distances between the individual lens units are changed, during which the fourth lens unit does not move in the direction of the optical axis.

At that time, the fourth lens unit is moved so as to have a component perpendicular to the optical axis for image blur correction. In other words, the fourth lens unit L4 is moved so as to have a component perpendicular to the optical axis to change the imaging position of the entire system in the direction perpendicular to the optical axis. The fourth lens unit L4 is constituted by a positive lens and a negative lens. This allows eccentric chromatic aberration that occurs in the fourth lens unit L4 to be favorably corrected also in image blur correction for a large image blur angle at the telephoto end.

Furthermore, the fourth lens unit L4 having negative refractive power is disposed between the third lens unit L3 having positive refractive power and the fifth lens unit L5 having positive refractive power. This facilitates aberration correction by decreasing the incidence height of light passing through the fourth lens unit L4 while maintaining a high telecentric performance. Furthermore, by decreasing the lens effective diameter of the fourth lens unit L4, the size reduction of the image stabilizing unit is achieved even if the amount of image stabilizing correction is increased. By providing high refractive power to the lens components of the fourth lens unit L4, eccentric aberration due to image stabilization is satisfactorily corrected.

In the zoom lenses of the embodiments, the following conditional expressions are satisfied:

$$0.1 < |f4/ft| < 0.7 \quad (1)$$

$$0.8 < |f4p \cdot (n4p-1)/f4| < 4.0 \quad (2)$$

$$0.01 < |Dm \cdot (1-\beta 4t) \cdot \beta rt|/ft < 0.08 \quad (3)$$

where ft is the focal length of the entire system at the telephoto end; f4 is the focal length of the fourth lens unit; f4p is the focal length of the positive lens of the fourth lens unit; n4p is the refractive index of the material of the positive lens of the fourth lens unit; Dm is the maximum moving distance, at the telephoto end, of the component of the fourth lens unit perpendicular to the optical axis; β4t is the lateral magnification of the fourth lens unit at the telephoto end; and βrt is the lateral magnification, at the telephoto end, of a lens system disposed at the image plane side with respect to the fourth lens unit.

Next, the technical meaning of Conditional Expressions (1) to (3) will be described. Conditional Expression (1) defines the focal length, that is, the negative refractive power, of the fourth lens unit L4. If the refractive power of the fourth lens unit L4 is too low, exceeding the upper limit of Conditional Expression (1), the image stabilization sensitivity of the fourth lens unit L4 decreases to increase displacement during image blur, which increased the lens diameter, thus increasing the size of the image stabilizing unit. Furthermore, light beams exiting from the fourth lens unit L4 are prone to converge, which decreases the focusing sensitivity of the fifth lens unit L5 to disadvantageously increase the moving stroke in focusing.

If the refractive power of the fourth lens unit L4 is too high, exceeding the lower limit of Conditional Expression (1), eccentric curvature, eccentric astigmatism, eccentric coma aberration, etc. are frequently generated from the fourth lens unit L4 during image blur correction. Conditional Expression (2) defines the refractive power of the positive lens that constitutes the fourth lens unit L4. If the refractive power of the positive lens is too low, exceeding the upper limit of Conditional Expression (2), eccentric chromatic aberration is frequently generated from the fourth lens unit L4 at the telephoto end during image stabilizing correction, which is difficult to correct. This is also difficult to correct using the other lens units. In contrast, if the refractive power of the positive lens is too high, exceeding the lower limit of Conditional Expression (2), the curvature of the surface of the negative lens that constitutes the fourth lens unit L4 becomes too high, causing excessive correction of spherical aberration.

Conditional Expression (3) defines the maximum moving distance of the image-stabilizing fourth lens unit L4 during image blur correction. If the maximum moving distance of the fourth lens unit L4 is too long, exceeding the upper limit of Conditional Expression (3), the image blur correction angle can be increased, but one-side defocusing, eccentric coma, and eccentric chromatic aberration are disadvantageously frequently generated from the fourth lens unit L4, and the image stabilizing unit is increased in size. In contrast, if the maximum moving distance of the fourth lens unit L4 is too short, exceeding the lower limit of Conditional Expression (3), it becomes difficult to obtain a sufficient image blur correction effect at the telephoto end. In Conditional Expression (3), $(1-\beta 4t) \cdot \beta rt$ is image stabilization sensitivity that shows the ratio of the moving distance of the fourth lens unit L4 in the direction perpendicular to the optical axis to the moving distance of an image point on an imaging plane caused to move along the imaging plane. The larger the value, the smaller distance the image point can be moved.

Preferably, the numerical ranges of Conditional Expressions (1) to (3) are set as follows:

$$0.15 < |f4/ft| < 0.6 \quad (1a)$$

$$0.85 < |f4p \cdot (n4p-1)/f4| < 3.5 \quad (2a)$$

$$0.012 < |Dm \cdot (1-\beta 4t) \cdot \beta rt|/ft < 0.06 \quad (3a)$$

More preferably, the numerical ranges of Conditional Expressions (1a) to (3a) are set as follows:

$$0.2 < |f4/ft| < 0.5 \quad (1b)$$

$$0.9 < |f4p \cdot (n4p-1)/f4| < 3.0 \quad (2b)$$

$$0.015 < |Dm \cdot (1-\beta 4t) \cdot \beta rt|/ft < 0.04 \quad (3b)$$

The above configuration facilitates image blur correction while reducing the size and weight of the fourth lens unit L4 for image blur correction. Furthermore, the above configuration allows image blur correction while maintaining a high optical performance for a large image blur angle at the telephoto end.

More preferably, the embodiments satisfy one or more of the following conditions:

$$v4p < 23.0 \quad (4)$$

$$0.5 < fw \cdot t/(f3 \cdot f5) < 1.5 \quad (5)$$

$$0.7 < D4t/D4w < 2.0 \quad (6)$$

$$-0.5 < (R4a - R4b)/(R4a + R4b) < 1.0 \quad (7)$$

$$2.0 < f3/fw < 5.0 \quad (8)$$

$$4.0 < (f1)^2/|f4| \cdot f5 < 20.0 \quad (9)$$

$$7.0 < v4n - v4p < 50.0 \quad (10)$$

$$2.0 < |f4|/fw < 7.0 \quad (11)$$

$$0.25 < f2/f4 < 0.90 \quad (12)$$

where fw is the focal length at the wide-angle end of the entire system; f1, f2, f3, and f5 are the focal lengths of the first lens unit L1, the second lens unit L2, the third lens unit L3, and the fifth lens unit L5, respectively; v4p and v4n are the Abbe numbers of the materials of the positive lens and the negative lens of the fourth lens unit L4, respectively; D4w and D4t are the distances between the fourth lens unit L4 and the fifth lens unit L5 at the wide-angle end and at the telephoto end, respectively; and R4a and R4b are the radii of curvature of the positive lens of the fourth lens unit L4 at the object side and at the image plane side, respectively.

Next, the technical meaning of the above Conditional Expressions will be described. Conditional Expression (4) defines the Abbe number of the material of the positive lens of the fourth lens unit L4. If the Abbe number of the material of the positive lens is too large, exceeding the upper limit of Conditional Expression (4), the divergence is so narrow that eccentric chromatic aberration is frequently generated from the fourth lens unit L4 during image blur correction, thus causing insufficient correction.

Conditional Expression (5) defines the focal lengths, that is, refractive powers, of the fifth lens unit L5 and the third lens unit L3. If the refractive powers of the third lens unit L3 and the fifth lens unit L5 are too high, exceeding the upper limit of the Conditional Expression (5), the angle of incidence of marginal light of axial light beams incident on the fourth lens unit L4 and the angle of emergence of off-axis beams that exit from the fourth lens unit L4 become too sharp. As a result, high-order spherical aberration is frequently generated from the incident-side surface of the fourth lens unit L4. Furthermore, curvature of field and lateral chromatic aberration are frequently generated from the exiting-side lens surface, which is difficult to correct using the fourth lens unit L4 and the other lens units.

In contrast, if the refractive powers of the third lens unit L3 and the fifth lens unit L5 are too low, exceeding the lower limit of the Conditional Expression (5), the height of incidence of light that passes through the fourth lens unit L4 becomes too high. This results in an increase in the effective lens diameter of the fourth lens unit L4, which increases the driving mechanism for the fourth lens unit for image stabilization, thus making it difficult to reduce the size of the entire lens system. Furthermore, changes in the angle of incidence and emergence of the marginal light during image blur correction become too great, which increases the occurrence of one-side defocusing and eccentric chromatic aberration. Furthermore, this needs a large driving torque for image blur correction, which makes it difficult to reduce the size of the entire lens system.

Conditional Expression (6) defines the distances between the fourth lens unit L4 and the fifth lens unit L5 at the wide-angle end and at the telephoto end. If the distance between the fourth lens unit L4 and the fifth lens unit L5 at the telephoto end is too long, exceeding the upper limit of Conditional Expression (6), the height of light incident on the fifth lens unit L5 of off-axis beams that have passed through the fourth lens unit L4 having a divergent action becomes too large. This results in excessive changes in curvature of field and lateral chromatic aberration along with focusing. Furthermore, this increases the outside lens diameter of the fifth lens unit L5, which increases a driving torque for focusing, thus making it difficult to reduce the size of the entire lens system. If the distance between the fourth lens unit L4 and the fifth lens unit L5 at the telephoto end is too short, exceeding the lower limit of Conditional Expression (6), it becomes difficult to ensure a moving stroke of the fifth lens unit L5 necessary for focusing at the telephoto end.

Conditional Expression (7) defines the shape factor of the positive lens of the fourth lens unit L4. If the factor exceeds the upper limit, 1, of Conditional Expression (7), the positive lens has a biconvex shape having a convex surface at the object side. If the value exceeds the upper limit to increase the curvature of the convex surface at the object side, the angle of off-axis light beams incident on the fourth lens unit L4 as light beams diverging from the optical axis becomes too sharp. This causes lateral chromatic aberration to increase toward the under side, thus increasing changes in lateral chromatic aberration during image blur correction. If the value exceeds the lower limit of Conditional Expression (7) to excessively increase the degree of the meniscus shape, the curvature of the convex surface at the image plane side becomes to high, which generates excessive spherical aberration at the under side and causes excessive eccentric coma aberration and eccentric chromatic aberration during image blur correction.

Conditional Expression (8) defines the focal length of the third lens unit L3. If the focal length of third lens unit L3 is too large, in other words, the refractive power is too low, exceeding the upper limit of Conditional Expression (8), the light-beam converging action at the third lens unit L3 becomes short. This excessively increases the incidence height of light beams passing through the fourth lens unit L4, thus making it difficult to reduce the size of the entire lens system. In contrast, if the refractive power of the third lens unit L3 is too high, exceeding the lower limit of Conditional Expression (8), spherical aberration and longitudinal chromatic aberration are frequently generated from the third lens unit L3, which is difficult to correct using the other lens units.

Conditional Expression (9) defines the ratios of the focal lengths of the fourth lens unit L4 and the fifth lens unit L5 to that of the first lens unit L1. If the refractive powers of the fourth lens unit L4 and the fifth lens unit L5 are too high, exceeding the upper limit of Conditional Expression (9), a diverging action that off-axis beams are acted upon by the fourth lens unit L4 and a converging action that off-axis beams are acted upon by the fifth lens unit L5 in the vicinity of an imaging plane become too strong. This excessively increase changes in the angle of off-axis light beams incident on the image plane when the fifth lens unit L5 moves for zooming or focusing, thus making it difficult to ensure a telecentric performance in the entire zooming area. If the refractive powers of the fourth lens unit L4 and the fifth lens unit L5 are too low, exceeding the lower limit of Conditional Expression (9), the lateral magnifications of the individual lens units become small at the telephoto ends, which excessively decreases the image stabilization sensitivity. This makes it difficult to obtain sufficient hand shake correction angles at the telephoto ends.

Conditional Expression (10) defines the Abbe numbers of the materials of the positive lens and the negative lens of the fourth lens unit L4. If the difference in Abbe number between the materials of the positive lens and the negative lens is too large, exceeding the upper limit of Conditional Expression (10), the longitudinal chromatic aberration of the fourth lens unit L4 increases toward the under side. If the difference in Abbe number is too small, exceeding the lower limit of Conditional Expression (10), correction of the longitudinal chromatic aberration of the fourth lens unit L4 becomes insufficient. In both of the excessive correction and insufficient correction of longitudinal chromatic aberration, the eccentric chromatic aberration during image blur correction becomes too large due to chromatic aberration remaining in the fourth lens unit L4, which makes it difficult to obtain a sufficient hand shake correction angle at the telephoto end.

Conditional Expression (11) defines the ratio of the refractive power of the fourth lens unit L4 at the wide-angle end to the focal length of the entire system. If the refractive power of the fourth lens unit L4 is too low, exceeding the upper limit of Conditional Expression (11), the divergent action to off-axis beams at the image plane side with respect to the aperture SP becomes short, thus increasing the effective front lens diameter. In contrast, if the refractive power of the fourth lens unit L4 is too high, exceeding the lower limit of Conditional Expression (11), spherical aberration, curvature of field, coma aberration, etc are frequently generated from the fourth lens unit L4, which is difficult to correct using the other lens units.

Conditional Expression (12) defines the ratio of the focal length of the second lens unit L2 to that of the fourth lens unit L4. If the focal length of the second lens unit L2 is too large relative to the fourth lens unit L4, exceeding the upper limit of Conditional Expression (12), the moving stroke of the second lens unit L2 due to zooming increases, and thus increasing the size of the entire system. If the focal length of the second lens unit L2 is too small, exceeding the lower limit of Conditional Expression (12), changes in lateral chromatic aberration due to zooming become too large, which is difficult to correct using the other lens units.

More preferably, the numerical ranges of Conditional Expressions (4) to (12) are set as follows:

$$\nu 4p < 21.5 \tag{4a}$$

$$0.6 < fw \cdot ft/(f3 \cdot f5) < 1.4 \tag{5a}$$

$$0.8 < D4t/D4w < 1.8 \tag{6a}$$

$$-0.35 < (R4a-R4b)/(R4a+R4b) < 0.85 \tag{7a}$$

$$2.5 < f3/fw < 4.5 \tag{8a}$$

$$5.0 < (f1)^2/|f4| \cdot f5 < 18.0 \tag{9a}$$

$$9.0 < \nu 4n - \nu 4p < 45.0 \tag{10a}$$

$$2.2 < |f4|/fw < 6.0 \tag{11a}$$

$$0.35 < f2/f4 < 0.85 \tag{12a}$$

More preferably, if the numerical ranges of Conditional Expressions (4a) to (12a) are set as follows, the advantages of the individual Conditional Expressions (4a) to (12a) can easily be given:

$$\nu 4p < 20.0 \tag{4b}$$

$$0.1 < fw \cdot ft/(f3 \cdot f5) < 1.3 \tag{5b}$$

$$0.9 < D4t/D4w < 1.7 \tag{6b}$$

$$-0.2 < (R4a-R4b)/(R4a+R4b) < 0.7 \tag{7b}$$

$$2.8 < f3/fw < 4.0 \tag{8b}$$

$$5.5 < (f1)^2/|f4| \cdot f5 < 16.0 \tag{9b}$$

$$10.0 < \nu 4n - \nu 4p < 40.0 \tag{10b}$$

$$2.4 < |f4|/fw < 5.0 \tag{11b}$$

$$0.40 < f2/f4 < 0.80 \tag{12b}$$

When the Conditional Expressions are satisfied described above, a compact zoom lens having a high zoom ratio can be provided in which a compensation lens unit for image blur correction is compact and lightweight, image blur correction is easy, and image blur can be corrected for a large image blur angle at the telephoto end while a high optical performance can be maintained.

The individual embodiments will be described.

First Embodiment

In the first embodiment of FIG. 1, when zooming from the wide-angle end to the telephoto end, the second lens unit L2 moves to the image side, the third lens unit L3 moves to the object side, and the fifth lens unit L5 moves to the image plane side in a convex locus. During zooming, the first and fourth lens units L1 and L4 do not move, thus simplifying the zooming mechanism. This embodiment employs a rear focusing type in which the fifth lens unit L5 is moved on the optical axis for focusing, as described above. The fourth lens unit L4 is moved to have a component perpendicular to the optical axis so that the imaging position is moved in the direction perpendicular to the optical axis. In other words, the blur of a picture (image blur) when the zoom lens vibrates (slants) is corrected.

The fourth lens unit L4 is not moved on the optical axis during zooming so that the configuration of the image stabilizing performance is simplified, and the size reduction of the entire zoom lens system is facilitated. The aperture stop SP is disposed between the second lens unit L2 and the third lens unit L3. The aperture stop SP is fixed during zooming so that the focusing mechanism is simplified. The aperture stop diameter of the aperture stop SP is variable during zooming so that spherical aberration at any zooming position is reduced. Unnecessary light is cut off to reduce generation of flare. In particular, the aperture diameter at a zooming position at which spherical aberration and flare light increase can be reduced to maintain a high optical performance.

The first lens unit L1 includes, in order from the object side to the image side, a cemented lens in which a meniscus negative lens that is convex to the object side and a positive lens that is convex to the object side are cemented together and a meniscus positive lens that is convex to the object side. Since the first lens unit L1 is composed of three lenses, spherical aberration, longitudinal chromatic aberration, and lateral chromatic aberration are favorably corrected with a high zoom ratio.

The second lens unit L2 includes, in order from the object side to the image side, a negative lens that is sharply concave to the image side (that is, the absolute value of the refractive power is higher at the image side than at the object side), a biconcave negative lens, and a positive lens that is convex to the object side. This suppresses changes in curvature of field, astigmatism, lateral chromatic aberration, etc. due to zooming. Since the image-side surface of the negative lens of the second lens unit L2 nearest to the object side is aspherical, an image plane variation at the peripheral field angle (the periphery of the field) due to zooming is effectively corrected.

The third lens unit L3 includes a biconvex positive lens, a negative lens that is sharply concave to the image plane side, and a biconvex positive lens. With such a configuration of the third lens unit L3, spherical aberration and longitudinal chromatic aberration, and changes in the curvature of field and astigmatism due to zooming are suppressed. Furthermore, eccentric aberration, such as eccentric coma aberration and eccentric curvature of field, generated in the fourth lens unit L4 during image blur correction is favorably corrected. Since both surfaces of the positive lens of the third lens unit L3 nearest to the object side are aspherical, spherical aberration is effectively corrected.

The fourth lens unit L4 is a cemented lens in which a positive lens and a negative lens are cemented together. The positive lens and the negative lens may be separated. Constituting the fourth lens unit L4 by a cemented lens facilitates an assembling work for holding it in the lens barrel. The separate lens configuration increases flexibility in lens design, thus allowing higher correction of eccentric aberration during image blur correction.

In this embodiment, the fourth lens unit L4 is constituted by a cemented lens in which a positive lens and a negative lens are cemented in this order from the object side. In the case where the cemented lens is configured in the order of the positive lens and the negative lens, the surface of the cemented lens is convex to the image side; however, since the cemented lens surface has a large incidence angle with respect to axial light beams that converge to the optical axis, higher aberration correction is facilitated. This makes it easy to correct, of eccentric aberration components generated during image blur correction, an eccentric coma aberration component irrelevant to the field angle.

The cemented lens may be configured in the order of the negative lens and the positive lens. In this case, the cemented lens surface is convex to the object side and has a large incidence angle with respect to off-axis beams that diverge with respect to the optical axis. This facilitates correction of eccentric curvature of field, eccentric astigmatism, etc. during image blur correction. This also applies to the separate configuration without the cemented lens.

The fifth lens unit L5 is constituted by a cemented lens in which a negative lens and a positive lens are cemented together. This allows weight reduction by using one lens component while effectively correcting lateral chromatic aberration, the curvature of field, etc. due to focusing.

Instead of the configuration of the cemented lens in which the negative lens and the positive lens are arranged in this order from the object side to the image side, the positive lens and negative lens may be arranged in this order. Instead of the cemented lens, separate lenses may be employed. In the first embodiment, the maximum image blur correction angle at the telephoto end is 1.5°, and the corresponding maximum moving distance Dm of the fourth lens unit L4 in the direction perpendicular to the optical axis is 1.36 mm.

Second Embodiment

The second embodiment in FIG. 4 differs from the first embodiment in FIG. 1 in that: the aperture stop SP moves to the image side in a convex locus when zooming from the wide-angle end to the telephoto end; and the aperture stop diameter of the aperture stop SP is fixed during zooming to facilitate control of the aperture diameter. In the second embodiment, the aperture stop SP is moved so that the distance from the first lens surface to the entrance pupil is reduced from the wide-angle end to an intermediate zooming position to decrease the effective front lens diameter, and unnecessary flare light is effectively cut off (blocked) at the intermediate zooming position.

In the second embodiment, the aperture stop diameter of the aperture stop SP may be variable during zooming, as in the first embodiment. The second embodiment also differs in that the fifth lens unit L5 is constituted by a cemented lens in which a positive lens and a negative lens are cemented together in order from the object side to the image side. In the second embodiment, the maximum image blur correction angle at the telephoto end is 2.0°, and the corresponding maximum moving distance Dm of the fourth lens unit L4 in the direction perpendicular to the optical axis is 1.28 mm. The remaining configuration is the same as that of the first embodiment.

Third Embodiment

The third embodiment in FIG. 7 differs from the first embodiment in FIG. 1 in that the fourth lens unit L4 is constituted by a cemented lens in which a negative lens and a positive lens are cemented together in order from the object side to the image side. In the third embodiment, the maximum image blur correction angle at the telephoto end is 1.0°, and the corresponding maximum moving distance Dm of the fourth lens unit L4 in the direction perpendicular to the optical axis is 1.15 mm. The remaining configuration is the same as that of the first embodiment.

Fourth Embodiment

The fourth embodiment in FIG. 10 differs from the first embodiment in FIG. 1 in that the first lens unit L1 moves to the image side in a convex locus when zooming from the wide-angle end to the telephoto end, during which the first lens unit L1 moves toward the object side at the telephoto end relative to the wide-angle end. This reduces the moving distance of the second lens unit L2 during zooming, thus reducing the size of the optical system. Another difference is that the fourth lens unit L4 is constituted by a positive lens and a negative lens in order from the object side to the image side, with an air space therebetween.

Since the fourth lens unit L4 is composed of a separate positive lens and negative lens, the flexibility of aberration correction is increased as compared with the cemented lens, and thus, eccentric aberration during image blur correction is reduced while a large zoom ratio is ensured. In the fourth embodiment, the maximum image blur correction angle at the telephoto end is 1.2°, and the corresponding maximum moving distance Dm of the fourth lens unit L4 in the direction perpendicular to the optical axis is 0.98 mm. The remaining configuration is the same as that of the first embodiment.

Fifth Embodiment

The fifth embodiment in FIG. 13 differs from the first embodiment in FIG. 1 in that the sixth lens unit L6 having negative refractive power that is not moved during zooming is provided at the image side with respect to the fifth lens unit L5; and the sixth lens unit L6 is constituted by a meniscus negative lens that is convex to the image side. By disposing the sixth lens unit L6 at the image side with respect to the fifth lens unit L5, changes in aberration during image stabilization across the entire zooming range is reduced. The sixth lens unit L6 is fixed at a position close to the image plane IP during zooming. Since the sixth lens unit L6 can be fixed immediately in front of an image pickup element, the configuration can be simplified as compared with the lens barrel configuration of the first embodiment.

This embodiment reduces the entire lens length by disposing the sixth lens unit L6 having negative refractive power at a position of the zoom lens nearest to the image plane and with a telephoto configuration of the entire lens system. This embodiment favorably corrects the curvature of field with the aspherical object-side surface of the lens constituting the sixth lens unit L6. An aspherical image-side lens surface can also offer the same advantage. Another difference is that the cemented lens of the fourth lens unit L4 is constituted by a negative lens and a positive lens in order from the object side to the image side.

In the fifth embodiment, the maximum image blur correction angle at the telephoto end is 1.8°, and the corresponding maximum moving distance Dm of the fourth lens unit L4 in the direction perpendicular to the optical axis is 1.74 mm. The remaining configuration is the same as that of the first embodiment.

Next, an embodiment of a digital still camera (image pickup apparatus) that uses a zoom lens according to an embodiment of the present invention as a photographing optical system will be described with reference to FIG. 16. In FIG. 16, the digital still camera includes a camera main body 20, a photographing optical system 21 constituted by one of the zoom lenses described in the first to fifth embodiments, a solid-state image pickup element (photoelectric conversion element) 22, such as a CCD sensor and a CMOS sensor, built in the camera main body 20 and receiving a object image formed by the photographing optical system 21, a memory 23 that stores information corresponding to the object image subjected to photoelectric conversion by the solid-state image pickup element 22, and a finder 24 constituted by a liquid-crystal display panel or the like for observing the object image formed on the solid-state image pickup element 22.

Next, an embodiment of a video camera (optical device) that uses a zoom lens according to an embodiment of the present invention as a photographing optical system will be described with reference to FIG. 17. In FIG. 17, the video camera includes a video camera main body 10, a photographing optical system 11 constituted by one of the zoom lenses described in the first to fifth embodiments, a solid-state image pickup element (photoelectric conversion element) 12, such as a CCD sensor and a CMOS sensor, built in the camera main body 10 and receiving an object image formed by the photographing optical system 11, a recording unit 13 that stores information corresponding to the object image subjected to photoelectric conversion by the solid-state image pickup element 12, and a finder 14 for observing an object image displayed on a display device (not shown). The display device may include a liquid crystal panel or the like, on which an object image formed on the image pickup element 12 is displayed.

By applying a zoom lens according to an embodiment of the present invention to an image pickup apparatus, such as a digital still camera and a video camera, a compact image pickup apparatus with a high optical performance is achieved. In the embodiments, large negative distortion is generated in the vicinity of the wide-angle end, and the image pickup range of the solid-state image pickup element is set smaller than that at the other zooming positions. The distortion of obtained image information may be electrically corrected by a signal processing circuit that processes the image data of the solid-state image pickup element so that an image with little distortion can be output.

Numerical examples corresponding to the embodiments of the present invention will be shown below. In the numerical examples, reference sign "i" denotes the order of the optical surface counted from the object side; ri denotes the radius of curvature of an ith optical surface; di denotes the ith interval (distance or space) between surfaces; and ndi and vdi denote the refractive index and the Abbe number of the material of the ith optical member with respect to Fraunhofer d-line, respectively; back focus (BF) is the distance from the last lens surface to a paraxial image plane, expressed as an equivalent air length; and an entire lens length is a value obtained by adding a back focus (BF) to the distance from the frontmost lens surface to the last lens surface of all lens units.

In the numerical examples, the last two surfaces are the surfaces of optical blocks, such as a filter and a faceplate. The unit of length is given in millimeters (mm). An aspherical surface is denoted by an asterisk (*) next to the surface number; parameters of the spherical surface can be expressed as:

$$X = \frac{(1/R)H^2}{1 + \sqrt{1 - (1+K)(H/R)^2}} + A4H^4 + A6H^6 + A8H^8$$

where K is eccentricity, A4, A6, and A8 are aspherical coefficients, x is a displacement at a height H from the optical axis with reference to a surface vertex, and R is a radius of curvature. In mathematical values, the scientific notation "e-Z" is equivalent to the exponential notation "$10^{-Z}$". Table 1 shows the relationship between the numerical examples and the conditional expressions described above. The half angle of view is a value obtained from a light trace (ray trace).

NUMERICAL EXAMPLE 1

| Surface data | | | | |
|---|---|---|---|---|
| Surface number | r | d | nd | vd |
| 1 | 65.289 | 1.35 | 1.84666 | 23.9 |
| 2 | 29.899 | 4.25 | 1.60311 | 60.6 |
| 3 | 2700.072 | 0.18 | | |
| 4 | 27.376 | 2.59 | 1.77250 | 49.6 |
| 5 | 88.653 | (Variable) | | |
| 6 | −8490.837 | 0.80 | 1.85135 | 40.1 |
| 7* | 7.098 | 3.38 | | |
| 8 | −16.926 | 0.55 | 1.69680 | 55.5 |
| 9 | 30.226 | 0.43 | | |
| 10 | 18.250 | 1.65 | 1.94595 | 18.0 |
| 11 | 503.407 | (Variable) | | |
| 12 (Aperture) | ∞ | (Variable) | | |
| 13* | 9.793 | 4.32 | 1.58313 | 59.4 |
| 14* | −26.668 | 1.35 | | |
| 15 | 83.519 | 0.55 | 1.76182 | 26.5 |
| 16 | 8.613 | 0.51 | | |
| 17 | 10.710 | 3.14 | 1.59282 | 68.6 |
| 18 | −17.404 | (Variable) | | |
| 19 | −24.900 | 1.39 | 1.92286 | 18.9 |
| 20 | −10.987 | 0.65 | 1.69680 | 55.5 |
| 21 | 13.484 | (Variable) | | |
| 22 | 12.181 | 0.50 | 1.92286 | 18.9 |
| 23 | 6.704 | 3.10 | 1.77250 | 49.6 |
| 24 | −48.434 | (Variable) | | |
| 25 | ∞ | 2.38 | 1.51633 | 64.1 |
| 26 | ∞ | 1.00 | | |
| Image plane | ∞ | | | |

-continued

Aspherical surface data

7th surface

K = −2.15687e−001  A4 = 2.09137e−005  A6 = 1.80348e−006
A8 = 4.17042e−009

13th surface

K = −4.28454e−001  A4 = −2.70765e−005  A6 = 1.26975e−006
A8 = −3.53158e−009

14th surface

K = 1.00711e+001  A4 = 2.66707e−004  A6 = 1.24774e−006

Various data
Zoom ratio 10.00

|  | Wide-angle end | intermediate | Telephoto end |
|---|---|---|---|
| Focal length | 3.80 | 9.64 | 38.00 |
| F-number | 1.80 | 2.69 | 3.00 |
| Half angle of view | 38.29 | 17.36 | 4.49 |
| Image height | 2.55 | 3.00 | 3.00 |
| Entire lens length | 77.31 | 77.31 | 77.31 |
| BF | 7.51 | 4.89 | 6.20 |
| d5 | 0.75 | 10.79 | 21.83 |
| d11 | 23.58 | 13.54 | 2.50 |
| d12 | 10.21 | 6.82 | 2.30 |
| d18 | 1.01 | 4.39 | 8.92 |
| d21 | 3.57 | 6.19 | 4.88 |
| d24 | 4.94 | 2.32 | 3.63 |

Zoom lens unit data

| Unit | First surface | Focal length |
|---|---|---|
| 1 | 1 | 41.42 |
| 2 | 6 | −7.45 |
| 3 | 13 | 12.48 |
| 4 | 19 | −14.43 |
| 5 | 22 | 14.73 |

-continued

Aspherical surface data

7th surface

K = −1.44539e−001  A4 = 6.84309e−005  A6 = −3.70320e−007
A8 = 1.18917e−007

13th surface

K = −4.19967e−001  A4 = −3.07345e−005  A6 = 1.39281e−006
A8 = −5.93820e−009

14th surface

K = 7.45146e+000  A4 = 3.25652e−004  A6 = 1.00484e−006

Various data
Zoom ratio 10.00

|  | Wide-angle end | intermediate | Telephoto end |
|---|---|---|---|
| Focal length | 3.80 | 10.53 | 38.00 |
| F-number | 1.86 | 2.49 | 3.00 |
| Half angle of view | 38.27 | 16.00 | 4.50 |
| Image height | 2.55 | 3.00 | 3.00 |
| Entire lens length | 75.49 | 75.49 | 75.49 |
| BF | 8.50 | 4.78 | 6.61 |
| d5 | 0.75 | 11.95 | 22.84 |
| d11 | 28.11 | 18.07 | 2.50 |
| d12 | 5.78 | 1.33 | 2.20 |
| d18 | 1.24 | 4.53 | 8.33 |
| d21 | 3.24 | 6.95 | 5.12 |
| d24 | 6.47 | 2.76 | 4.58 |

Zoom lens unit data

| Unit | First surface | Focal length |
|---|---|---|
| 1 | 1 | 42.88 |
| 2 | 6 | −7.18 |
| 3 | 13 | 11.45 |
| 4 | 19 | −9.82 |
| 5 | 22 | 12.97 |

NUMERICAL EXAMPLE 2

Surface data

| Surface number | r | d | nd | νd |
|---|---|---|---|---|
| 1 | 60.921 | 0.80 | 1.84666 | 23.9 |
| 2 | 30.766 | 3.37 | 1.59282 | 68.6 |
| 3 | 408.944 | 0.18 | | |
| 4 | 27.448 | 2.34 | 1.77250 | 49.6 |
| 5 | 84.695 | (Variable) | | |
| 6 | 91.212 | 0.50 | 1.85135 | 40.1 |
| 7* | 6.905 | 3.48 | | |
| 8 | −14.866 | 0.50 | 1.80400 | 46.6 |
| 9 | 26.291 | 0.46 | | |
| 10 | 18.930 | 1.60 | 2.00272 | 19.3 |
| 11 | −145.160 | (Variable) | | |
| 12 (Aperture) | ∞ | (Variable) | | |
| 13* | 10.043 | 3.95 | 1.58313 | 59.4 |
| 14* | −24.356 | 1.69 | | |
| 15 | 77.223 | 0.55 | 1.76182 | 26.5 |
| 16 | 8.870 | 0.48 | | |
| 17 | 0.918 | 2.63 | 1.59282 | 68.6 |
| 18 | −14.096 | (Variable) | | |
| 19 | −35.872 | 1.48 | 2.10205 | 16.8 |
| 20 | −7.750 | 0.65 | 2.00330 | 28.3 |
| 21 | 12.257 | (Variable) | | |
| 22 | 14.367 | 2.71 | 1.78800 | 47.4 |
| 23 | −8.320 | 0.50 | 1.92286 | 20.9 |
| 24 | −22.526 | (Variable) | | |
| 25 | ∞ | 1.50 | 1.51633 | 64.1 |
| 26 | ∞ | 1.04 | | |
| Image plane | ∞ | | | |

NUMERICAL EXAMPLE 3

Surface data

| Surface number | r | d | nd | νd |
|---|---|---|---|---|
| 1 | 69.055 | 1.35 | 1.84666 | 23.9 |
| 2 | 29.662 | 4.59 | 1.60311 | 60.6 |
| 3 | −302.015 | 0.18 | | |
| 4 | 24.670 | 2.40 | 1.77250 | 49.6 |
| 5 | 67.257 | (Variable) | | |
| 6 | −186.802 | 0.80 | 1.85135 | 40.1 |
| 7* | 6.995 | 3.23 | | |
| 8 | −18.143 | 0.55 | 1.69680 | 55.5 |
| 9 | 39.328 | 0.93 | | |
| 10 | 21.495 | 1.55 | 1.94595 | 18.0 |
| 11 | 2692.752 | (Variable) | | |
| 12 (Aperture) | ∞ | (Variable) | | |
| 13* | 9.678 | 4.44 | 1.58313 | 59.4 |
| 14* | −29.078 | 1.42 | | |
| 15 | 49.086 | 0.55 | 1.76182 | 26.5 |
| 16 | 8.834 | 0.67 | | |
| 17 | 12.749 | 2.75 | 1.59282 | 68.6 |
| 18 | −22.958 | (Variable) | | |
| 19 | −34.276 | 0.65 | 1.65844 | 50.9 |
| 20 | 11.509 | 0.90 | 1.94595 | 18.0 |
| 21 | 14.671 | (Variable) | | |
| 22 | 12.682 | 0.50 | 2.00272 | 19.3 |
| 23 | 7.479 | 2.91 | 1.80400 | 46.6 |
| 24 | −39.827 | (Variable) | | |
| 25 | ∞ | 1.80 | 1.51633 | 64.1 |
| 26 | ∞ | 0.50 | | |
| Image plane | ∞ | | | |

-continued

Aspherical surface data

7th surface

K = −2.01319e−001  A4 = −6.62594e−005  A6 = 3.81953e−006
A8 = −8.87870e−008

13th surface

K = 1.28488e−003  A4 = −1.06484e−004  A6 = 3.28848e−007
A8 = −5.96025e−009

14th surface

K = 3.61267e+000  A4 = 1.53763e−004  A6 = 4.38509e−007

Various data
Zoom ratio 10.00

|  | Wide-angle end | intermediate | Telephoto end |
|---|---|---|---|
| Focal length | 3.80 | 9.51 | 38.00 |
| F-number | 1.80 | 2.69 | 3.00 |
| Half angle of view | 38.29 | 17.59 | 4.51 |
| Image height | 2.55 | 3.00 | 3.00 |
| Entire lens length | 76.14 | 76.14 | 76.14 |
| BF | 6.91 | 4.87 | 6.21 |
| d5 | 0.75 | 9.90 | 20.72 |
| d11 | 22.47 | 13.33 | 2.50 |
| d12 | 10.45 | 6.70 | 2.33 |
| d18 | 1.73 | 5.48 | 9.86 |
| d21 | 3.46 | 5.51 | 4.17 |
| d24 | 5.22 | 3.18 | 4.52 |

Zoom lens unit data

| Unit | First surface | Focal length |
|---|---|---|
| 1 | 1 | 38.40 |
| 2 | 6 | −7.45 |
| 3 | 13 | 13.43 |
| 4 | 19 | −17.00 |
| 5 | 22 | 14.07 |

NUMERICAL EXAMPLE 4

Surface data

| Surface number | r | d | nd | vd |
|---|---|---|---|---|
| 1 | 56.679 | 0.90 | 1.92286 | 20.9 |
| 2 | 32.364 | 3.42 | 1.59282 | 68.6 |
| 3 | −1198.750 | 0.18 | | |
| 4 | 26.548 | 2.48 | 1.77250 | 49.6 |
| 5 | 72.332 | (Variable) | | |
| 6 | 67.196 | 0.60 | 1.85135 | 40.1 |
| 7* | 6.488 | 3.22 | | |
| 8 | −13.939 | 0.50 | 1.88300 | 40.8 |
| 9 | 25.262 | 0.40 | | |
| 10 | 17.165 | 1.62 | 2.04731 | 15.8 |
| 11 | −1588.927 | (Variable) | | |
| 12 (Aperture) | ∞ | (Variable) | | |
| 13* | 9.795 | 3.84 | 1.55332 | 71.7 |
| 14* | −22.937 | 1.33 | | |
| 15 | 49.982 | 0.55 | 1.76182 | 26.5 |
| 16 | 9.853 | 0.48 | | |
| 17 | 12.934 | 2.63 | 1.59282 | 68.6 |
| 18 | −12.837 | (Variable) | | |
| 19 | −26.886 | 0.97 | 1.96245 | 17.2 |
| 20 | −13.245 | 0.10 | | |
| 21 | −14.627 | 0.60 | 1.80400 | 46.6 |
| 22 | 11.058 | (Variable) | | |
| 23 | 10.558 | 0.50 | 1.96245 | 17.2 |
| 24 | 6.917 | 3.29 | 1.77250 | 49.6 |
| 25 | −75.991 | (Variable) | | |
| 26 | ∞ | 2.00 | 1.51633 | 64.1 |
| 27 | ∞ | 0.52 | | |
| Image plane | ∞ | | | |

-continued

Aspherical surface data

7th surface

K = 3.22337e−001  A4 = −1.29267e−004  A6 = 1.54065e−006
A8 = −1.79787e−007

13th surface

K = −1.89087e−001  A4 = −8.84695e−005  A6 = 1.78953e−006
A8 = −1.40266e−008

14th surface

K = 6.92897e+000  A4 = 3.85310e−004  A6 = 1.84798e−006

Various data
Zoom ratio 12.00

|  | Wide-angle end | intermediate | Telephoto end |
|---|---|---|---|
| Focal length | 3.75 | 14.07 | 45.00 |
| F-number | 1.80 | 2.75 | 3.00 |
| Half angle of view | 38.81 | 12.12 | 3.82 |
| Image height | 2.55 | 3.00 | 3.00 |
| Entire lens length | 69.85 | 67.34 | 73.43 |
| BF | 6.39 | 6.23 | 6.52 |
| d5 | 0.75 | 12.73 | 23.92 |
| d11 | 21.83 | 7.34 | 2.25 |
| d12 | 6.76 | 2.49 | 1.70 |
| d18 | 1.60 | 5.87 | 6.65 |
| d22 | 4.90 | 5.06 | 4.77 |
| d25 | 4.55 | 4.39 | 4.68 |

Zoom lens unit data

| Unit | First surface | Focal length |
|---|---|---|
| 1 | 1 | 39.71 |
| 2 | 6 | −6.23 |
| 3 | 13 | 10.74 |
| 4 | 19 | −10.91 |
| 5 | 23 | 13.69 |

NUMERICAL EXAMPLE 5

Surface data

| Surface number | r | d | nd | vd |
|---|---|---|---|---|
| 1 | 66.252 | 1.00 | 1.84666 | 23.9 |
| 2 | 28.235 | 3.69 | 1.60311 | 60.6 |
| 3 | −421.230 | 0.15 | | |
| 4 | 25.162 | 2.36 | 1.77250 | 49.6 |
| 5 | 80.633 | (Variable) | | |
| 6 | −256.896 | 0.60 | 1.85135 | 40.1 |
| 7* | 6.697 | 2.98 | | |
| 8 | −15.481 | 0.50 | 1.71300 | 53.9 |
| 9 | 44.791 | 0.45 | | |
| 10 | 19.628 | 1.27 | 1.95906 | 17.5 |
| 11 | −785.960 | (Variable) | | |
| 12 (Aperture) | ∞ | (Variable) | | |
| 13* | 8.711 | 3.24 | 1.58313 | 59.4 |
| 14* | −24.414 | 1.83 | | |
| 15 | 43.414 | 0.55 | 1.80518 | 25.4 |
| 16 | 7.625 | 0.42 | | |
| 17 | 9.549 | 2.77 | 1.59282 | 68.6 |
| 18 | −14.997 | (Variable) | | |
| 19 | −91.684 | 0.60 | 1.80400 | 46.6 |
| 20 | 7.561 | 0.86 | 1.95906 | 17.5 |
| 21 | 10.629 | (Variable) | | |
| 22 | 10.009 | 0.50 | 2.00272 | 19.3 |
| 23 | 6.053 | 3.48 | 1.80400 | 46.6 |
| 24 | −32.190 | (Variable) | | |
| 25* | −7.288 | 0.70 | 1.68893 | 31.1 |
| 26 | −9.804 | 0.70 | | |

-continued

| 27 | ∞ | 1.20 | 1.51633 | 64.1 |
|---|---|---|---|---|
| 28 | ∞ | 0.40 | | |
| Image plane | ∞ | | | |

Aspherical surface data

7th surface

K = −2.44751e−001  A4 = −5.41742e−006  A6 = 1.97850e−006
A8 = −2.30153e−009

13th surface

K = 6.59512e−002  A4 = −1.47161e−004  A6 = 9.78187e−007
A8 = −9.44541e−009

14th surface

K = −9.40930e−001  A4 = 2.58770e−004  A6 = 7.41386e−007

25th surface

K = −7.54322e−001  A4 = 2.90418e−004

Various data
Zoom ratio 10.00

| | Wide-angle end | intermediate | Telephoto end |
|---|---|---|---|
| Focal length | 3.80 | 9.19 | 38.00 |
| F-number | 1.80 | 2.70 | 3.00 |
| Half angle of view | 38.29 | 18.09 | 4.51 |
| Image height | 2.55 | 3.00 | 3.00 |
| Entire lens length | 65.16 | 65.16 | 65.16 |
| BF | 1.89 | 1.89 | 1.89 |
| d5 | 0.75 | 9.38 | 20.25 |
| d11 | 20.50 | 11.87 | 1.00 |
| d12 | 6.99 | 4.37 | 0.85 |
| d18 | 1.00 | 3.61 | 7.14 |
| d21 | 3.44 | 4.98 | 3.53 |
| d24 | 2.63 | 1.10 | 2.54 |

Zoom lens unit data

| Unit | First surface | Focal length |
|---|---|---|
| 1 | 1 | 37.27 |
| 2 | 6 | −7.13 |
| 3 | 13 | 10.89 |
| 4 | 19 | −12.78 |
| 5 | 22 | 11.21 |
| 6 | 25 | −46.48 |

TABLE 1

| Conditional Expression | Numerical Example 1 | Numerical Example 2 | Numerical Example 3 | Numerical Example 4 | Numerical Example 5 |
|---|---|---|---|---|---|
| (1) | 0.38 | 0.26 | 0.45 | 0.24 | 0.34 |
| (2) | 1.30 | 0.98 | 2.76 | 2.31 | 1.80 |
| (3) | 0.026 | 0.035 | 0.017 | 0.021 | 0.031 |
| (4) | 18.9 | 16.8 | 18.0 | 17.2 | 17.5 |
| (5) | 0.79 | 0.97 | 0.76 | 1.15 | 1.18 |
| (6) | 1.37 | 1.58 | 1.20 | 0.97 | 1.03 |
| (7) | 0.39 | 0.64 | −0.12 | 0.34 | −0.17 |
| (8) | 3.28 | 3.01 | 3.54 | 2.86 | 2.87 |
| (9) | 8.08 | 14.44 | 6.15 | 10.56 | 9.70 |
| (10) | 36.6 | 11.5 | 32.9 | 29.4 | 29.1 |
| (11) | 3.80 | 2.59 | 4.47 | 2.91 | 3.36 |
| (12) | 0.52 | 0.73 | 0.44 | 0.57 | 0.56 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-247270 filed on Nov. 4, 2010, which is hereby incorporated by reference herein in its entirety.

What is claimed is:

1. A zoom lens comprising:
a first lens unit having positive refractive power;
a second lens unit having negative refractive power;
a third lens unit having positive refractive power;
a fourth lens unit having negative refractive power; and
a fifth lens unit having positive refractive power;
wherein the first, second, third, fourth and fifth lens units are arranged in order from an object side to an image plane side along an optical axis of the zoom lens,
wherein the fourth lens unit includes a positive lens and a negative lens and is configured to move in a direction having a component perpendicular to the optical axis so as to move an imaging position in a direction perpendicular to the optical axis; and
wherein, during zooming, the fourth lens unit does not move, and the second, third and fifth lens units move in a direction of the optical axis; and
the following conditional expressions are satisfied:

$$0.1 < |f4/ft| < 0.7$$

$$0.8 < |f4p \cdot (n4p-1)/f4| < 4.0$$

$$0.01 < |Dm \cdot (1-\beta 4t)/ft| < 0.08$$

$$2.4 < |f4|/fw < 7.0$$

where ft is a focal length of the zoom lens at a telephoto end; f4 is a focal length of the fourth lens unit; f4$p$ is a focal length of the positive lens of the fourth lens unit; n4$p$ is a refractive index of a material of the positive lens of the fourth lens unit; Dm is a maximum moving distance, at the telephoto end, of the component of the fourth lens unit perpendicular to the optical axis; β4$t$ is a lateral magnification of the fourth lens unit at the telephoto end; β$rt$ is a lateral magnification, at the telephoto end, of a lens system disposed at the image plane side with respect to the fourth lens unit; and fw is a focal length of the zoom lens at a wide-angle end.

2. The zoom lens according to claim 1, wherein the fourth lens unit consists of a positive lens and a negative lens.

3. The zoom lens according to claim 1, wherein the following conditional expression is satisfied:

$$v4p < 23.0$$

where v4$p$ is an Abbe number of the material of the positive lens of the fourth lens unit.

4. The zoom lens according to claim 1, wherein the following conditional expression is satisfied:

$$7.0 < v4n - v4p < 50.0$$

where v4$p$ is an Abbe number of a material of the positive lens of the fourth lens unit, and v4$n$ is an Abbe number of a material of the negative lens of the fourth lens unit.

5. The zoom lens according to claim 1, wherein the following conditional expression is satisfied:

$$-0.5 < (R4a - R4b)/(R4a + R4b) < 1.0$$

where R4$a$ is a radius of curvature of a surface of the positive lens of the fourth lens unit at the object side, and R4$b$ is a radius of curvature of a surface of the positive lens of the fourth lens unit at the image plane side.

6. The zoom lens according to claim 1, wherein the fifth lens unit consists of a positive lens and a negative lens.

7. The zoom lens according to claim 1, wherein, during zooming from a wide-angle end to the telephoto end, the fifth lens unit moves to the image plane side in a convex locus.

8. The zoom lens according to claim 1, wherein the following conditional expression is satisfied:

$$4.0 < (f1)^2/(|f4| \cdot f5) < 20.0$$

where f1 is a focal length of the first lens unit, and f5 is a focal length of the fifth lens unit.

9. The zoom lens according to claim 1, wherein the following conditional expression is satisfied:

$$0.25 < f2/f4 < 0.90$$

where f2 is a focal length of the second lens unit.

10. The zoom lens according to claim 1, wherein the following conditional expression is satisfied:

$$2.0 < f3/fw < 5.0$$

where f3 is a focal length of the third lens unit, and fw is a focal length of the zoom lens at a wide-angle end.

11. The zoom lens according to claim 1, wherein the following conditional expression is satisfied:

$$0.5 < fw \cdot ft/(f3 \cdot f5) < 1.5$$

where fw is a focal length of the zoom lens at a wide-angle end; f3 is a focal length of the third lens unit; and f5 is a focal length of the fifth lens unit.

12. The zoom lens according to claim 1, wherein the following conditional expression is satisfied:

$$0.7 < D4t/D4w < 2.0$$

where D4w is a distance between the fourth lens unit and the fifth lens unit at a wide-angle end, and D4t is a distance between the fourth lens unit and the fifth lens unit at the telephoto end.

13. The zoom lens according to claim 1, further comprising a sixth lens unit having negative refractive power at the image plane side with respect to the fifth lens unit, the sixth lens unit not moving when zooming.

14. The zoom lens according to claim 1, wherein an image is formed on a solid-state image pickup element.

15. An image pickup apparatus comprising:
a zoom lens; and
a solid-state image pickup element receiving an image formed by the zoom lens,
wherein the zoom lens comprises:
  a first lens unit having positive refractive power;
  a second lens unit having negative refractive power; a third lens unit having positive refractive power;
  a fourth lens unit having negative refractive power; and
  a fifth lens unit having positive refractive power;
  wherein the first, second, third, fourth and fifth lens units are arranged in order from an object side to an image plane side along an optical axis of the zoom lens,
  wherein the fourth lens unit includes a positive lens and a negative lens and is configured to move in a direction having a component perpendicular to the optical axis so as to move an imaging position in a direction perpendicular to the optical axis; and
  wherein, during zooming, the fourth lens unit does not move, and the second, third and fifth lens units move in a direction of the optical axis; and
the following conditional expressions are satisfied:

$$0.1 < |f4/ft| < 0.7$$

$$0.8 < |f4p \cdot (n4p-1)/f4| < 4.0$$

$$0.01 < |Dm \cdot (1-\beta 4t)\beta rt|/ft < 0.08$$

$$2.4 < |f4|/fw < 7.0$$

where ft is a focal length of the zoom lens at a telephoto end; f4 is a focal length of the fourth lens unit; f4p is a focal length of the positive lens of the fourth lens unit; n4p is a refractive index of a material of the positive lens of the fourth lens unit; Dm is a maximum moving distance, at the telephoto end, of the component of the fourth lens unit perpendicular to the optical axis; β4t is a lateral magnification of the fourth lens unit at the telephoto end; βrt is a lateral magnification, at the telephoto end, of a lens system disposed at the image plane side with respect to the fourth lens unit; and fw is a focal length of the zoom lens at a wide-angle end.

* * * * *